US012778851B1

(12) United States Patent
DeJonge

(10) Patent No.: US 12,778,851 B1
(45) **Date of Patent: *Nov. 3, 2026**

(54) PATIENT ACTIVATED, PROGRAMMABLE, REFILLABLE MEDICATION DISPENSER WITH INTERNALLY SCHEDULED METERED DISPENSING

(71) Applicant: DeJonge Associates, Inc., Lake Mary, FL (US)

(72) Inventor: Stuart W. DeJonge, Lake Mary, FL (US)

(73) Assignee: DEJONGE ASSOCIATES, INC.

( * ) Notice: Subject to any disclaimer, the term of this patent is extended or adjusted under 35 U.S.C. 154(b) by 427 days.

This patent is subject to a terminal disclaimer.

(21) Appl. No.: 17/803,268

(22) Filed: Apr. 14, 2022

Related U.S. Application Data

(63) Continuation-in-part of application No. 16/501,745, filed on Jun. 4, 2019, now abandoned.

(51) Int. Cl.

| | |
|---|---|
| ***A61J 7/04*** | (2006.01) |
| ***A61J 1/18*** | (2023.01) |
| ***A61J 7/00*** | (2006.01) |

(52) U.S. Cl.
CPC ............... *A61J 7/0409* (2013.01); *A61J 1/18* (2013.01); *A61J 7/0084* (2013.01)

(58) Field of Classification Search
CPC ...... A61J 7/0445; A61J 7/0472; A61J 7/0084; A61J 1/18; A61J 7/0409; B65D 83/0409; G07F 17/0092
USPC .................................................. 221/263, 197
See application file for complete search history.

(56) References Cited

U.S. PATENT DOCUMENTS

| | | | | |
|---|---|---|---|---|
| 3,828,972 A * | 8/1974 | Bender | ..................... | A61J 7/04 221/197 |
| 4,490,711 A | 12/1984 | Johnston | | |
| 4,588,303 A | 5/1986 | Wirtschafter et al. | | |
| 4,663,621 A | 5/1987 | Field et al. | | |
| 4,725,997 A | 2/1988 | Urquhart et al. | | |
| 4,748,600 A | 5/1988 | Urquhart | | |
| 4,768,177 A | 8/1988 | Kehr et al. | | |
| 4,942,544 A | 7/1990 | Mcintosh et al. | | |
| 5,142,484 A | 8/1992 | Kaufman et al. | | |
| 5,200,891 A | 4/1993 | Kehr et al. | | |

(Continued)

*Primary Examiner* — Timothy R Waggoner
(74) *Attorney, Agent, or Firm* — Wilkinson Law Office; Clinton H. Wilkinson

(57) ABSTRACT

A programmable, refillable medication dispenser with scheduled metered medication unit dispensing, includes a main housing, a powered CPU with countdown timer, a multi-unit medication removable refillable cartridge with a (first) lock a medication release control gate, e.g., a toggle, positioned at a medication outlet and connected to a (second) lock being a gate control mechanism. A pharmacist will insert a medicine cartridge into the main housing, locking it in, and will program the CPU to permit a patient to self-activate dispensing according to a predetermined schedule such that when medication dispensing is permitted, the patient dispensing control component may be activated and the gate mechanism may be activated for dispensing, and when medication dispensing is prohibited, the gate control mechanism cannot be activated. Thus, a patient may then receive the dispenser and activate medication dispensing according to the programmed schedule.

18 Claims, 21 Drawing Sheets

(56) References Cited

U.S. PATENT DOCUMENTS

| | | | | |
|---|---|---|---|---|
| 5,230,441 | A | 7/1993 | Kaufman et al. | |
| 6,163,737 | A | 12/2000 | Fedor et al. | |
| 7,751,932 | B1 | 7/2010 | Fedor et al. | |
| 7,767,093 | B2 | 8/2010 | Frank et al. | |
| 8,453,874 | B2 | 6/2013 | Simpson et al. | |
| 9,007,875 | B2 | 4/2015 | Nurse et al. | |
| 9,558,596 | B2 | 1/2017 | Nurse et al. | |
| 10,512,592 | B1 * | 12/2019 | Sandhu | G07F 9/001 |
| 11,594,329 | B2 * | 2/2023 | Dejonge | A61J 7/0445 |
| 2005/0205598 | A1 * | 9/2005 | Gelardi | B65D 83/0409 221/266 |
| 2011/0295416 | A1 * | 12/2011 | Aquilonius | A61J 7/0076 221/98 |
| 2012/0145740 | A1 * | 6/2012 | Chu | B65D 83/0409 221/277 |

* cited by examiner

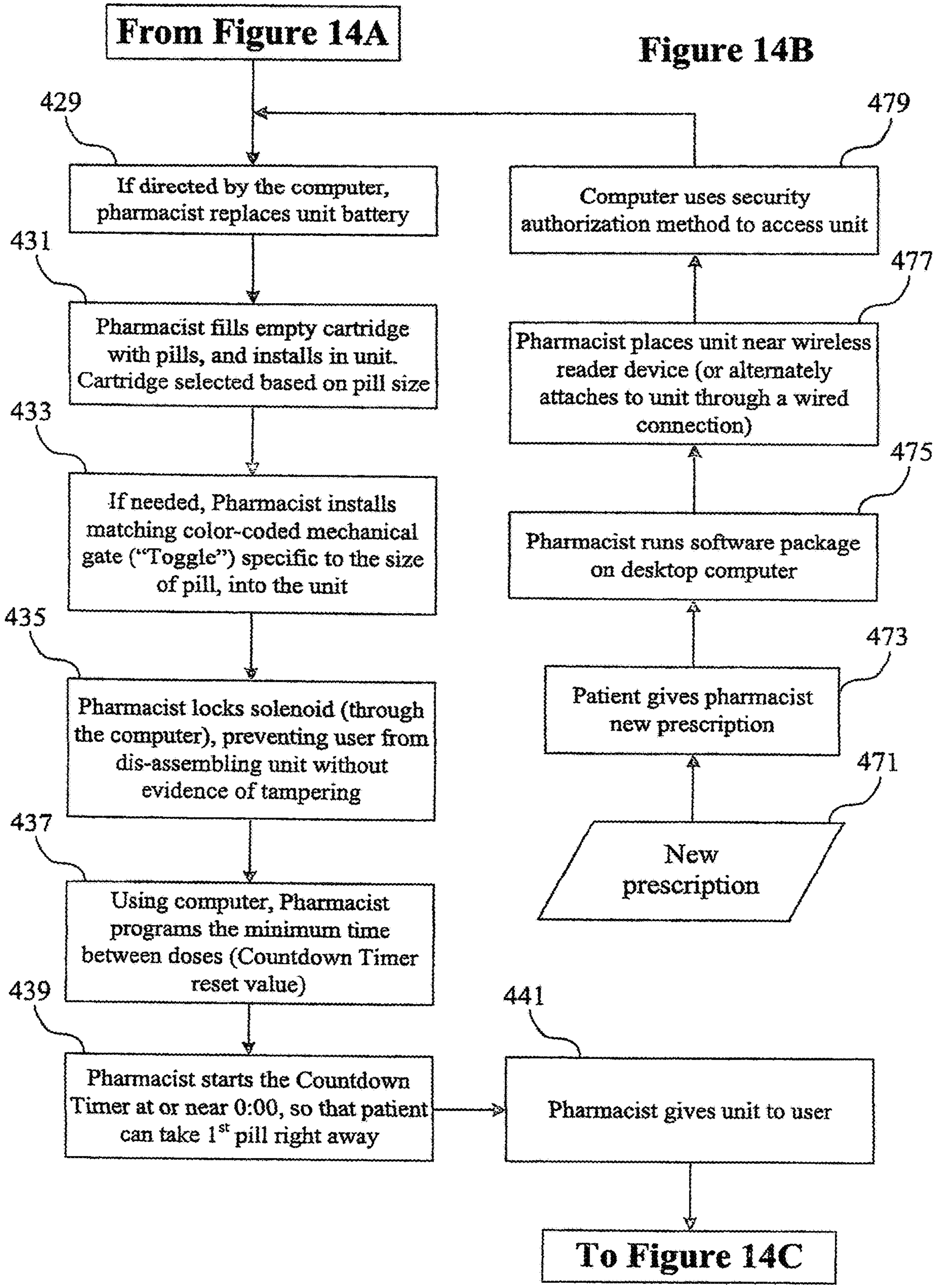
From Figure 14A
Figure 14B
429
If directed by the computer, pharmacist replaces unit battery
431
Pharmacist fills empty cartridge with pills, and installs in unit. Cartridge selected based on pill size
433
If needed, Pharmacist installs matching color-coded mechanical gate ("Toggle") specific to the size of pill, into the unit
435
Pharmacist locks solenoid (through the computer), preventing user from dis-assembling unit without evidence of tampering
437
Using computer, Pharmacist programs the minimum time between doses (Countdown Timer reset value)
439
Pharmacist starts the Countdown Timer at or near 0:00, so that patient can take 1st pill right away
441
Pharmacist gives unit to user
To Figure 14C
479
Computer uses security authorization method to access unit
477
Pharmacist places unit near wireless reader device (or alternately attaches to unit through a wired connection)
475
Pharmacist runs software package on desktop computer
473
Patient gives pharmacist new prescription
471
New prescription

PATIENT ACTIVATED, PROGRAMMABLE, REFILLABLE MEDICATION DISPENSER WITH INTERNALLY SCHEDULED METERED DISPENSING

REFERENCE TO RELATED APPLICATIONS

The present application is a continuation in part of co-pending U.S. patent application Ser. No. 16/501,745, filed on Jun. 4, 2019, titled "PROGRAMMABLE, REFILLABLE MEDICATION PACKAGE WITH SCHEDULED METERED DISPENSING", by the same inventor herein.

BACKGROUND OF INVENTION a. Field of Invention

The present invention generally relates to devices for the distribution/release of medication to patients that are especially beneficial for the timed controlled release of medication that may be either dangerous or addictive or both, e.g., for the timed release of opioids and patient-controlled chemotherapy. Thus, the present invention is directed to devices that receive safe cartridges of medication dosages, to be released within an internally programmed and stored permitted time schedule, by the patient. The present invention devices are thus dispensers that include two separate locks, one being a multi-unit medication cartridge lock functionally connected to a central processing unit and positioned adjacent a cartridge receiver for locking and unlocking the medication cartridge (so that it is secure except for a professional access, such as a pharmacist, dispensary agent or nurse), and the other being a control gate mechanism (lock) connected to the CPU and to a medication release control gate to permit or prohibit activation of the gate for medication dosage release according to a programmed timer. These present invention devices are adaptable for use with pills, capsules and tablets, hereinafter referred to as "solid medication units" and "solid medication doses," and the release chutes may be structured to hold only one solid medication unit or two. Excluded from the present invention are medications that flow, such as loose powder and liquid medications. Internally scheduled timers used herein are meant to be those devices in which the time schedule is stored and that schedule functions within the present invention devices.

b. Description of Related Art

The following patents are representative of the field pertaining to the present invention:

U.S. Pat. No. 9,558,596 to Nurse et al describes dosing times for medication that may be tracked by taking into account preset dosing sequences and when users indicate that they have taken the medication. The medication may also be kept in its original container. An encoder disk may be attached to a medicine container. The encoder disk may be encoded with a dosing frequency that indicates how frequently the medication should be taken, as well as any other desired information. A base station may be configured to accept and hold one or more medicine containers. The base station may be configured to read the encoded dosage from the encoder disk, an RFID tag, a barcode, or another component capable of conveying dosing information, and detect when the medicine container is removed from and placed on the base station. The base station may also include various indicators of its current state.

U.S. Pat. No. 9,007,875 to Nurse et al describes a medicine station or standalone alert device that has a processor having access to memory, wherein the memory stores a control module, and the processor is configured to execute the modules stored in the memory. The medicine station or stand-alone alert device also includes one or more indicators. The control module is configured to periodically check for an external notification from a primary alert device that it is time to take a medication. Upon receiving the external notification, the control program is configured to cause the medicine station or stand-alone alert device to enter an amplified alert mode with respect to the primary alert device via the one or more indicators.

U.S. Pat. No. 8,453,874 to Simpson et al describes a dispenser and method for dispensing pills to patients from cartridges featuring downloadable remotely programmable timer and network communications links, alerting timer, databasing, printer, and battery.

U.S. Pat. No. 7,751,932 to Fedor et al describes a system for monitoring and dispensing medical items that includes a plurality of hook registers. Each of the hook registers includes sensors sensing the removal or addition of a medical item to the storage location on the book register. Each book register has a microprocessor connected to the sensor which stores a count of the items added or removed from the location. The microprocessor also includes location identifying information specifically associated with the particular hook register. The microprocessor is periodically polled by a controller which reads and stores the count and location identifying information from each of the hook registers. The controller information is periodically read by a data terminal which is connected through a local area network to a remote computer having a processor and data store. A user of the data terminal is enabled to specify a patient for whom medical items will be used when the items are removed from the hook registers or other storage locations. In addition, the system also monitors inventories of items and levels of usage by users. The system also monitors and controls the dispense of other medical items from box registers as well as controls the dispense of items from secure storage locations such as electronic lock drawers and medicine dispensers.

U.S. Pat. No. 7,467,093 to Newton et al describes a method of tracking and dispensing medical items for use by patients associated with a health care institution that includes storing in a data store in connection with a computer data representative of patients and medical items prescribed for the patients. Authorized users such as a nurse, are enabled to dispense prescribed items for patients through medical item dispensers. A record is included in the data store that the medical items have been dispensed. In an exemplary system, medical items that have been dispensed are tracked to the point of giving the item to the patients using portable terminals that are carried to the bedside of the patients. The activity of giving the appropriate medical item to each respective patient is recorded in the portable terminal as medical items are given to a plurality of patients. The data stored in the portable terminal concerning the giving of medical items to patients is communicated through the system and stored in the data store to provide a record that the medical items which were dispensed for a patient were actually administered. In an alternative form of the system patients are enabled to dispense medications on an outpatient basis through a self-service medical item dispenser. In a method of operating such a system a benefit plan associated with the patient is determined from rules stored in connection with data representative of the benefit plan.

Payment for dispensed medications is provided by the benefits provider associated with the patient's benefits plan and a co-payment is made by the patient from a credit or debit card account.

U.S. Pat. No. 6,163,737 to Fedor et al describes a medical item dispensing apparatus that includes a dispenser which encloses a plurality of magazines. Each magazine holds a plurality of medical items which in the preferred form of the invention are cylindrical containers. Each magazine includes an opening. A guide and a front gate member are positioned adjacent to the opening. A back gate member is positioned further inward from the opening than the front gate member. The front gate member and back gate member are moved in coordinated relation so that the front gate member enables a medical item adjacent the opening to pass through the opening while the back gate member moves to prevent the other medical items in the magazine from moving toward the opening. After the dispense of the medical item from the magazine the front gate member moves to block the passage of further medical items through the opening while the back gate member moves to enable medical items to move toward the opening. The magazines dispense medical items from the dispenser responsive to a user terminal. The user terminal is operatively connected to a computer which includes a data store which maintains data representative of medical items taken for patients.

U.S. Pat. No. 5,230,411 to Kaufman et al describes a system for dispensing medication that includes a dispensing device unto which a prepackaged cassette can be releasably installed. The cassette contains medication that has been prepackaged in individual pockets along a strip. The strip is wound between a supply reel and a take up reel within the cassette. A control mechanism associated with the dispensing device advances the strip within the cassette by winding the strip onto the take up reel, while unwinding the strip from the supply reel, and while moving a dispensing mechanism also associated with the device into contact with the strip for opening a medication pocket to expel the medication from the strip and out of the cassette.

U.S. Pat. No. 5,200,891 to Kehr et al describes a device for monitoring medication of a patient and for prompting the patient into certain medication taking schedule and/or certain programming steps and routines. The device has a plurality of compartments, each of which may store medication and an electrical signaling system to emit medication alert signals from time-to-time, each of which the signals indicates (a) that medication should be taken, (b) from which compartment the medication should be taken, (c) and the quantity of medication to be taken. If a designated compartment is not opened and closed within a predetermined period of time, the electrical signaling system will sound an alarm. If each designated compartment is opened and closed, the take-medication signal and the alarm (if operating) are turned off and the event is recorded for later review. The device includes a display having a substantially continuous display area having portions thereof closely adjacent to each compartment.

U.S. Pat. No. 5,142,484 to Kaufman et al describes an interactive patient assistance device that houses first and second compartments for storing a first item and a second item away from access by the patient. First and second delivery mechanisms are associated with the first and second compartments for making the first stored item available to the patient in response to a first command signal and for making the second stored item available to the patient in response to a second command signal. The first and second items are delivered to the patient according to schedules stored in resident memory. The schedules may be altered by a prescribed command issued by the patient.

U.S. Pat. No. 4,942,541 to McIntosh et al describes a medication clock for producing a record of a patient in complying with a medication schedule. A data base is provided which stores the time and date of each medication that the patient takes including those medications taken in response to an alarm by the clock as well as medications taken by the choice of the patient. The dosage schedule may be programmed by reading of information written by the pharmacist.

U.S. Pat. No. 4,768,177 to Kehr et al describes a device for indicating when medication should be taken has plural compartments, each of which may store medication. An electrical signaling system emits take-medication signals from time to time, each of which said signals indicates (a) that medication should be taken, (b) from which compartment the medication should be taken, (c) the quantity of medication to be taken from the designated compartment, and instructions for taking the medication. If a designated compartment is not promptly opened and closed, the electrical signaling system will sound an alarm. If each designated compartment is opened and closed, the take-medication signal and the alarm (if operating) are turned off. A reload signal is given once a week, as a reminder to reload the compartments with medication. The device has modular construction. A first module has: (a) one of the compartments, (b) an alarm for producing an audible signal to alert the patient to take medication, (c) a timing signal generator for producing timing signals, (d) a circuit for energizing the alarm in response to selected timing signals, and (e) a switch for turning off said alarm when the medication has been taken from the container in the first module. Each remaining module is a plug-in device which has a compartment, receives timing signals from the first module, sends signals to activate said alarm in response to selected timing signals and a manual switch for deactivating said alarm when medication is taken from the compartment in the module.

U.S. Pat. No. 4,748,600 to Urquhart describes an interactive drug dispenser which actively controls the pattern in which doses of one or more pharmaceutical preparations are administered to a patient. The dispenser is programmed with information concerning an initial dosing regimen, and monitors deviations from that regimen. The dispenser is adapted to calculate from the dosage deviation a dosing error correction factor which corrects a patient's measured plasma drug concentration for deviations from a prescribed dosing regimen, so as to distinguish the effects of patients' dosing errors from suboptimal prescribed dosage regimens.

U.S. Pat. No. 4,725,997 to Urquhart describes a contingent dosing device which actively controls the pattern in which doses of one or more pharmaceutical preparations are administered to a patient. The device is programmed with information concerning an initial dosing regimen, and monitors deviations from that regimen. Based on the acceptability of the calculated deviations, the device may dispense or withhold medication. The invention also includes an automatic drug dosage method using the contingent dosing device.

U.S. Pat. No. 4,663,621 to Field et al describes a medicine cabinet that has a housing and a door. The door is provided with an electrically operated lock which is operable by using the push keys. The opening code for the lock is initially set by inserting four keys into four holes in a four by ten array of holes provided in the casing on the inside of the door. The circuits for the code pre-setting and code inputting circuits are provided on a membrane. The cabinet is provided with a light emitting diode (LED) and a buzzer which can be operated by timing means at set intervals. The LED and the buzzer also operate while the door is open. Additional facilities may also be provided on the cabinet.

U.S. Pat. No. 4,558,303 to Fielden describes an analogue voltage-to-digital voltage converter that has a voltage divider with a plurality of stages each providing an output voltage for comparison with the unknown voltage and in addition provides interpolation between the output voltage to improve the accuracy. Interpolation is effected by adding a ramp voltage to the unknown ramping through a magnitude equivalent to the voltage of at least one stage. With one tap on the voltage divider selected, comparison of the unknown plus ramp voltage is effected successively as the voltage ramps. By noting when the combined voltage reaches the level of one of the divider output voltages and by counting the number of comparisons made from the time when the ramp voltage is at a predetermined magnitude and comparing this with the time taken to ramp through one or a plurality of whole divider stages, determination can be made of the magnitude of the unknown voltage to a fraction of a stage.

U.S. Pat. No. 4,490,711 to Johnston describes a structure provided for assisting a person in keeping track of appointments, times for taking medication or the times for turning on electrical equipment or such. The structure comprises an electronic circuit capable of generating signals representing up to N different pre-set times at which specific events are to occur where N is a selected positive integer such as 20. Switches are then provided, each switch corresponding on a one-to-one basis to a unique pre-set time, such that the user can set those switches corresponding to the pre-set times at which the user desires events to take place. An alarm is provided to indicate in sequence when the actual time corresponds to the pre-set time corresponding to each set switch. The user can only shut off the alarm when the alarm is sounding and the system will then automatically record the number of times during which the alarm has come on and the user has responded to the alarm by silencing it thereby to provide a cumulative count of total events to which the user has responded. A doctor can then check the cumulative count to ensure that a patient has presumptively taken medicines prescribed at selected times in accordance with the programmed schedule on the structure. Because the alarm can only be silenced when it is sounding, accidental silencing of the alarm at any time is prevented. The structure of this invention combines the convenience and ease of an electronic alarm system with the simplicity and permanence of a written record of events.

Notwithstanding the prior art, the present invention is neither taught nor rendered obvious thereby.

SUMMARY OF INVENTION

The present invention is directed to patient-activated, programmable, refillable mediation dispensers with scheduled metered medication unit dispensing, wherein the schedule and its functionality are located within the dispensers to permit the patient to choose his/her own dispensing/treating time during the permitting dispensing time frame of the schedule. Some embodiments of these devices include extra features, such as child resistant dual activation components; some include communications components, as well.

In preferred embodiments, the present invention solid medication unit dispensers have dual locking mechanisms, one for an inserted cartridge and one for a dispensing gate, and these present invention dispensers include: a) a main housing having an outer structure with a cartridge receiver for insertion and removal of a multi-unit medication cartridge, and a medication outlet for controllably releasing a medication unit from said cartridge according to a programmed schedule; b) a powered, programmable central processing unit located in said main housing that includes sufficient hardware and software to include an internal, programmable timer for scheduled permitting and scheduled prohibiting of medication unit dispensing; c) a multi-unit medication cartridge lock functionally connected to said central processing unit and positioned adjacent said cartridge receiver for locking and unlocking a cartridge; d) a medication release control gate positioned at said medication outlet and connected to a gate control mechanism; e) said gate control mechanism having a first position prohibiting medication unit dispensing by closing said gate, and a second position permitting medication unit dispensing by opening said gate; f) a power source connected to said programmable central processing unit; g) a multi-unit solid medication cartridge positioned in said cartridge receiver of said main housing, said cartridge being sized to be inserted into and fitted in said cartridge receiver and having a dispensing orifice for alignment with said medication outlet of said main housing, said cartridge having no moving parts; and h) a plurality of solid medication units located inside said cartridge and being freely moveable therein.

In these embodiments, an authorized medication dispensing person will insert a multi-unit medication cartridge into said cartridge receiver of said main housing and will program said central processing unit to permit a patient user to accomplish dispensing activation according to a predetermined schedule such that when medication dispensing is permitted, said patient dispensing control component may be activated and said gate mechanism may be activated for dispensing, and when medication dispensing is prohibited, said gate control mechanism cannot be activated, and, further, a patient user may then receive said device and activate medication dispensing according to said schedule by operating said gate.

In some preferred embodiments of the present invention medication dispensers with scheduled metered medication unit dispensing, the medication dispenser further includes an externally exposed operate-indicator that has a first setting to indicate that said dispenser is inoperable and a second setting to indicate that said dispenser is operable for controllably releasing a medication unit from said cartridge. In some embodiments of the present invention programmable, refillable medication dispenser with scheduled metered medication unit dispensing, the indicator is selected from the group consisting of a visual indicator, and an audio indicator and combinations thereof. In some of these embodiments, the multi-unit medication cartridge lock includes a solenoid and lock bar having an extended lock position and a retracted unlock position, and in wherein said solenoid is functionally connected to said central processing unit. In some of these embodiments, the medication release control gate includes a gate wall and a gate solenoid functionally connected to said gate, said solenoid having a push bar, said push bar having an extended position maintaining a locked gate and having a retracted position maintaining an unlocked gate.

In some preferred embodiments of the present invention medication dispensers with scheduled metered medication unit dispensing, the medication release control gate is selected from the group consisting of a slide gate, a rotatable gate, and a hinged gate. In some preferred embodiments of the present invention medication dispensers with scheduled metered medication unit dispensing, the gate is a rotatable toggle gate. In some of these embodiments the rotatable toggle gate extends externally from said main housing on a rotational axle and said patient user may depress said toggle gate to release medication during scheduled times when dispensing is permitted.

In some preferred embodiments of the present invention medication dispensers with scheduled metered medication unit dispensing, there is further: at least one patient user control component connected to said central processing unit and externally exposed for user dispensing activation that functions as a child resistant feature that must be activated when said gate control mechanism is in its first position and the countdown time has reached zero, to permit medication unit dispensing by opening said gate. In some of these embodiments, the patient user dispensing control component is a button and said button operates in conjunction with said gate as a child resistant feature that must be simultaneously activated to dispense medication. In other embodiments, the button must be activated and then the toggle (gate) would be activated (pressed) to expose the dispensing chute.

In some preferred embodiments of the present invention medication dispensers with scheduled metered medication unit dispensing, there is a spring mechanism connected to said gate that biases said gate to its closed position.

In yet different embodiments of the present invention, the programmable, refillable medication dispenser with scheduled metered medication unit dispensing, includes: a) a main housing having an outer structure with a cartridge receiver for insertion and removal of a multi-unit medication cartridge, and a medication outlet for controllably releasing a medication unit from said cartridge according to a programmed schedule; b) a powered, programmable central processing unit located in said main housing that includes sufficient hardware and software to include a programmable timer for scheduled permitting and prohibiting of medication unit dispensing; c) a multi-unit medication cartridge lock functionally connected to said central processing unit and positioned adjacent said cartridge receiver for locking and unlocking a cartridge; d) a medication release control gate positioned at said medication outlet and connected to a gate control mechanism; e) said gate control mechanism having a first position prohibiting medication unit dispensing by closing said gate, and a second position permitting medication unit dispensing by opening said gate; f) a power source connected to said programmable central processing unit; and g) a communication mechanism connected to said control processing unit and adapted to communicate with a separate programming device for at least performing one of: (a) locking and unlocking a multi-unit medication cartridge; and (b) setting lock and unlock time frames for said timer. Thus, an authorized medication dispensing person (such as a pharmacist, a nurse or other professional) will insert a multi-unit medication cartridge into said cartridge receiver of said main housing and will program said central processing unit to permit a patient user to accomplish dispensing activation according to a predetermined schedule such that when medication dispensing is permitted, said gate mechanism may be activated for dispensing, and when medication dispensing is prohibited, said gate control mechanism cannot be activated, and, further, a patient user may then receive said device and activate medication dispensing according to said schedule by operating said gate to dispense medication. In some of these embodiments the communication mechanism is selected from the group consisting of a wire port and a wireless transmitter receiver. In some of these embodiments, the communication mechanism includes both a wire port and a wireless transmitter receiver. In some of these embodiments, the device further includes an externally exposed operate indicator that has a first setting to indicate that said dispenser is inoperable and a second setting to indicate that said dispenser is operable for controllably releasing a medication unit from said cartridge. The indicator may be selected from the group consisting of a visual indicator, and an audio indicator and combinations thereof. In some embodiments the audio indicator is an audio alarm.

In some of these embodiments with a communication mechanism, the multi-unit medication cartridge lock includes a solenoid and lock bar having an extended lock position and a retracted unlock position, and in wherein said solenoid is functionally connected to said central processing unit. In some of these embodiments, the medication release control gate includes a gate wall and a gate solenoid functionally connected to said gate, said solenoid having a push bar, said push bar having an extended position maintaining a locked gate and having a retracted position maintaining an unlocked gate. The medication release control gate may be selected from the group consisting of a slide gate, a rotatable gate, and a hinged gate. It is preferred that the gate is a rotatable toggle gate. In some of these embodiments, the rotatable toggle gate extends externally from said main housing on a rotational axle and said patient user may depress said toggle gate to release medication during scheduled times when dispensing is permitted.

In some of these embodiments with a communication mechanism, there is further h) at least one patient user control component connected to said central processing unit and externally exposed for user dispensing activation that functions as a child resistant feature that must be activated when said gate control mechanism is in its first position and the countdown is at zero, to permit medication unit dispensing by opening said gate.

In some of these embodiments with a communication mechanism, there is a spring mechanism connected to said gate that biases said gate to its closed position.

In some of these embodiments with a communication mechanism, the communication mechanism is a wireless transmitter receiver and preferably it is an NFC reader.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

Prior art dispensing devices for high level-controlled drugs (potentially addictive medications) typically have complex mechanical, electro-mechanical and/or complex wireless features that could deprive a patient of timely medication due to failures. The present invention offers a combination of many unique features. Two of these are simplicity and safety. The simplicity is partly due to the cartridges that are foolproof in that they rely upon gravity exit feed, and have yet no moving parts. Thus, this simplicity translates into fewer failures. The high safety comes from the security of the cartridge locked in the device and the separate, second level of security of the device itself-locked by the mechanisms and internal timer, and designed to be extremely difficult to pry into, coupled with preferred deterrent features.

FIGS. 14A, 14B, 14C and 14D show a flow diagram of the steps involved in the utilization of other embodiments of the present invention programmable, refillable medication dispensers with scheduled metered medication unit dispensing;

DETAILED DESCRIPTION OF THE EMBODIMENTS

Figure 1:
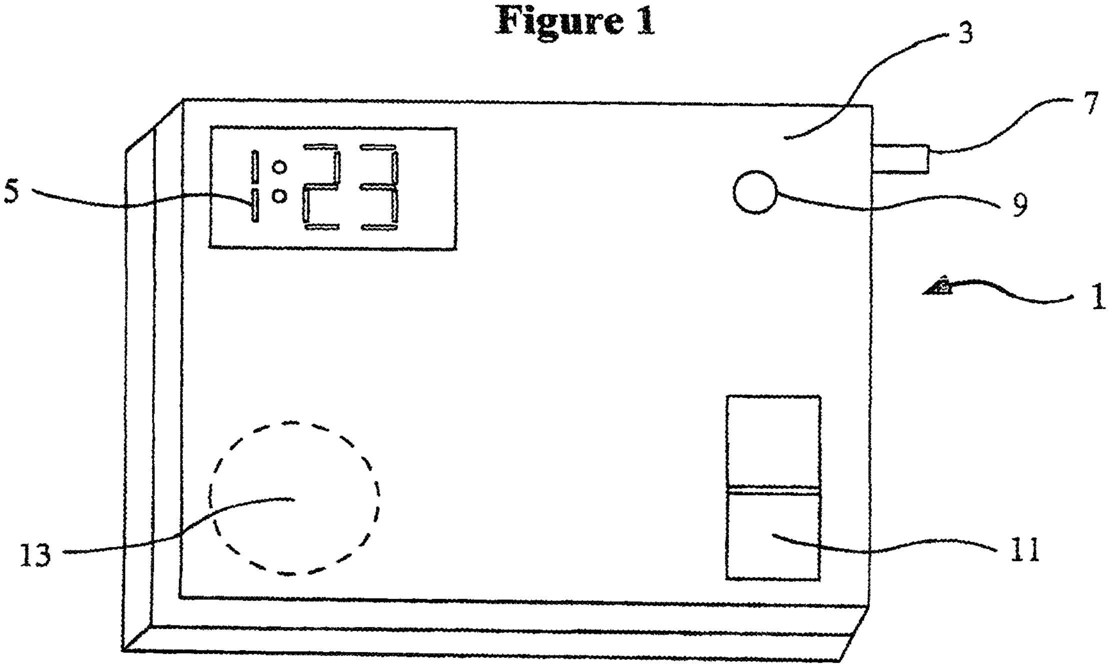
FIG. 1 shows a top view of one embodiment of a present invention programmable, refillable medication dispenser with scheduled metered solid medication unit dispensing.

The present invention is directed to unit dosage medicine dispensing devices that receive cartridges of medication dosages to be released on a timed schedule. The cartridges are safe because they are locked and are thus set up to deny access for medication abuse. The present invention dispenser devices include two separate locks, one being a multi-unit medication cartridge lock functionally connected to a CPU and positioned adjacent a cartridge receiver for locking and unlocking the medication cartridge (ergo, secure except for a professional access, such as a pharmacist, dispensary or nurse), and the other lock being a control gate mechanism connected to the CPU and to a medication release control gate (such as a toggle) to permit or prohibit activation of the gate for medication dosage release according to a timer.

Prior art dispensing devices for high level-controlled drugs (potentially addictive medications) typically have complex mechanical, electro-mechanical and/or complex wireless features that could deprive a patient of timely medication due to failures. The present invention offers a combination of many unique features. Two of these are simplicity and safety, The simplicity is partly due to the cartridges that are foolproof in that they rely upon gravity exit feed, and have yet no moving parts. Thus, this simplicity translates into fewer failures. The high safety comes from the security of the cartridge locked in the device and the separate, second level of security of the device itself-locked by the mechanisms and internal timer, and designed to be extremely difficult to pry into, coupled with preferred deterrent features.

The following is an example of how a present invention preferred dispenser device would work: a doctor would give the user patient a prescription for opioids or other dangerous drug, and the user patient would bring this script to the pharmacist. The pharmacist would take an empty cartridge and fill it with the correct opioid or other medicine, or would take a full cartridge from a pharma manufacturer. This cartridge would be color coded to a properly sized gate (e.g., a toggle). The pharmacist would then assemble both the Toggle and the Cartridge to the dispensing package. Both would be locked in place and could not be removed without breaking the device.

The pharmacist would then, using his computer, program the unit with the prescription's dosing instructions. The complete package would then be given to the user patient for use after instruction by the pharmacist. A display clock on the unit (a countdown clock is preferred) would tell the user patient when he could access a tablet. The user patient sees the clock count down to zero, at which time the CPU would activate a gate (Toggle) with a solenoid or equivalent mechanism) for medication release. The patient would have 1 hour to access the dose or the unit would automatically re-lock until the next dose is due. To access a tablet, the user patient would tilt the unit, allowing a single tablet to enter the Toggle chute, then push down on the toggle and one tablet would be dispensed. The Toggle is spring loaded and, when released by the user patient, it would automatically re-lock until the next dose is due.

When the cartridge is empty, the user patient would bring the device back to the pharmacy for either a refill or return of the deposit on the unit. If the dispenser or cartridge shows damage or tampering evidence, the refund would not be issued and a re-fill would not be honored. In preferred embodiments, the Toggle and the Cartridge will be made of clear plastic, allowing the user patient to see the tablet move to the slot in the Toggle for dispensing. Also, in some preferred embodiments an additional button must be pushed to open the gate (Toggle), and this creates a simultaneous dual action child resistant requirement.

FIG. 1 shows a top view of one embodiment of a present invention programmable, refillable medication dispenser 1 with scheduled metered medication unit dispensing as set by the pharmacy in accordance with a prescription. Dispenser 1 includes a main housing 3, a cartridge (not shown), a central processor (CPU) (not shown), a timer clock 5, a CR push button 7, a toggle 11, a battery 13, and an optional indicator light 9. The top of dispenser 1 is clear plastic so that a user can see the medication units and their movement. If the entire top is not clear, in preferred embodiments minimally the path area of the medication to and into the toggle 11 should be clear. Otherwise, a user may rely upon gravity to tilt to load the toggle 11 by feel and sound. When the indicator light 9 goes on (and thus at the same time the clock 5 goes to zero), a user must tilt dispenser 1 until the user sees a medication dosage load into toggle 11. Next, the user will push the CR push button 7 and then press the toggle 11 to dispense the medication dose. The CPU will reset and a countdown will be displayed on timer clock 5, counting down to the next appropriate time to dispense medication. This is repeated until a refill is required, as discussed below.

Figure 2A:
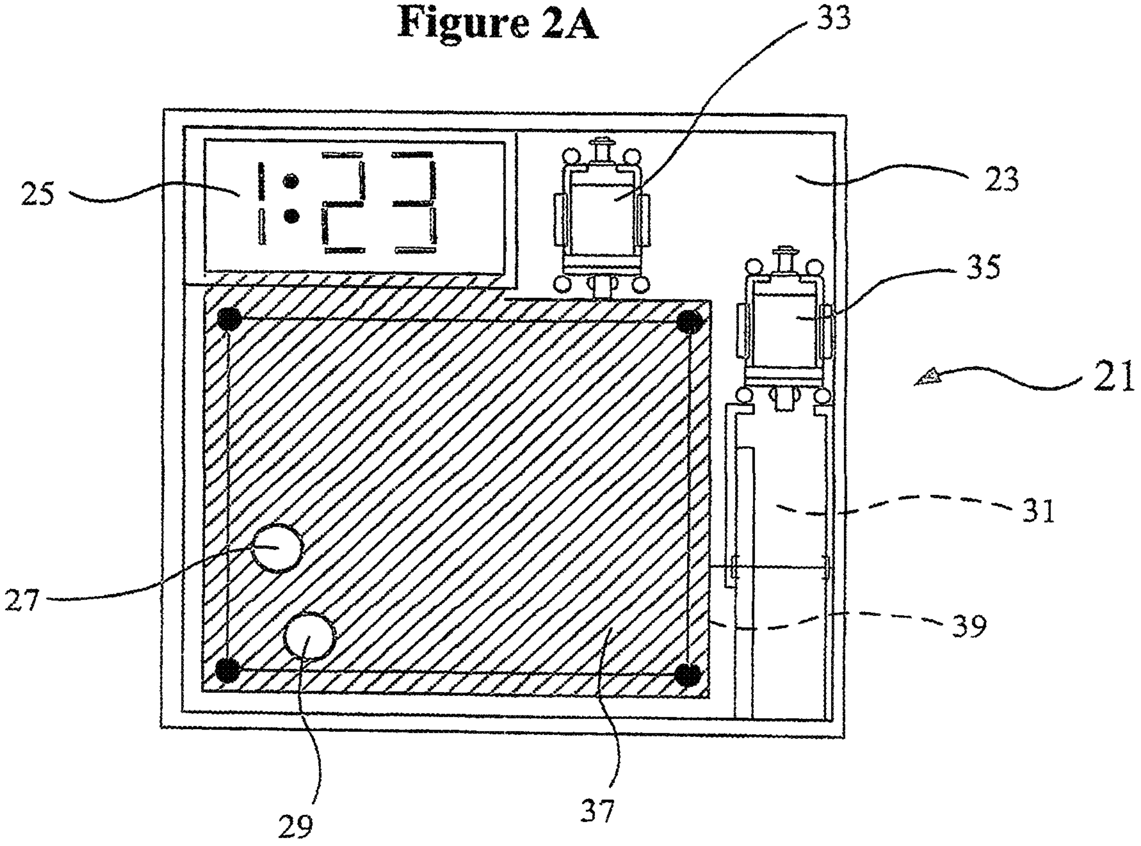
FIGS. 2A and 2B show a top view and a bottom cut view, respectively, of another embodiment of a present invention programmable, refillable medication dispenser with scheduled metered medication unit dispensing that includes a child resistant bypass/connect button that must be depressed to allow otherwise properly timed medication dispensing by activating a toggle.
Figure 2B:
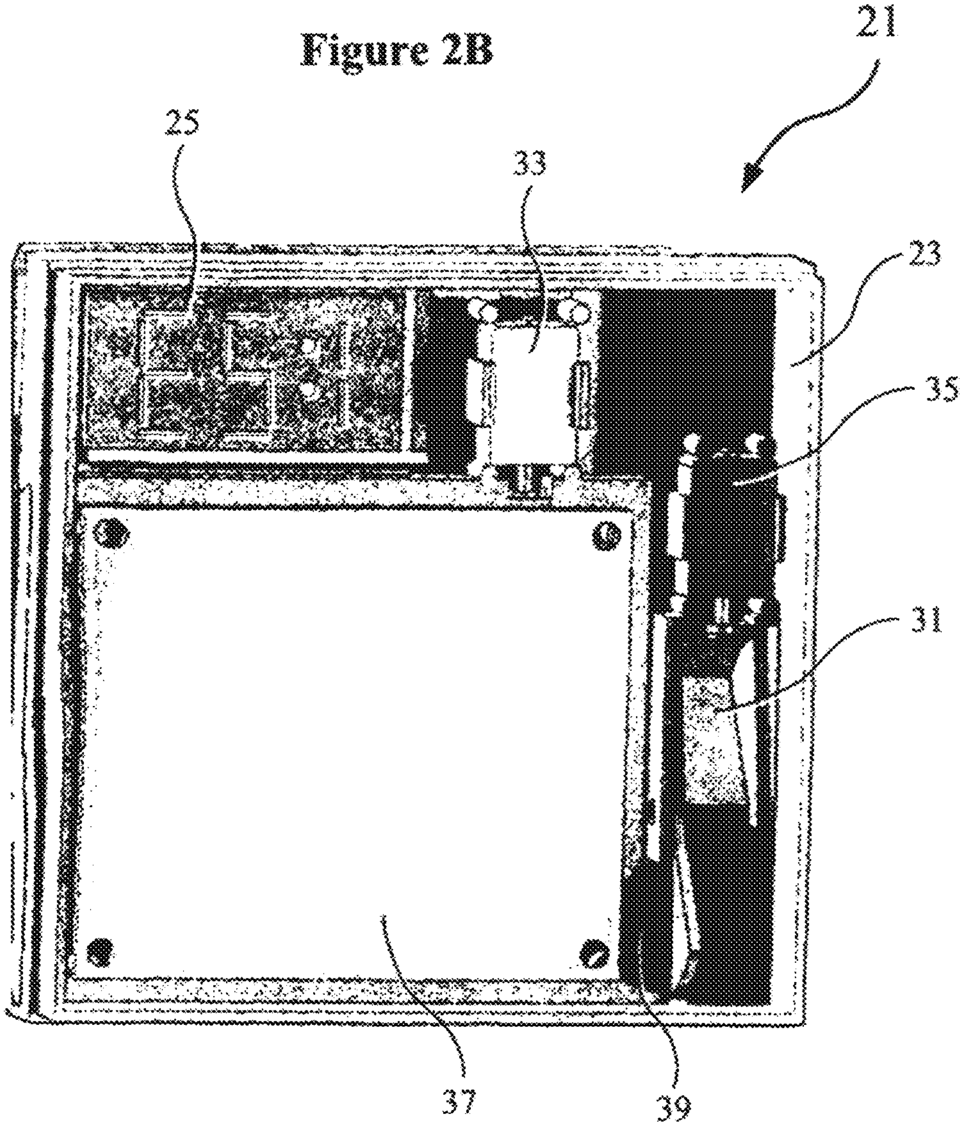

FIGS. 2A and 2B show a top view and a top cut view, respectively, of another embodiment of a present invention programmable, refillable medication dispenser with scheduled metered medication unit dispensing that shows more details of the locks, solenoids, cartridge and that includes a child resistant bypass/connect button that must be depressed to allow otherwise properly timed medication dispensing by activating a toggle. Here present invention device 21 has a main housing 23, a countdown clock 25 (with a CPU, not shown, located under clock 23), a child resistant (CR) safety button 27, a red/green light 29, such as an LED, that goes from red to green when dispensing is permitted, a dispensing gate-toggle 31, a cartridge locking solenoid locking piston 33, a gate locking solenoid and piston 35, and cartridge 37 with exit orifice 39. This device has been loaded with cartridge 37 by a pharmacist who has also set the time in the CPU memory in accordance with a prescription dosage regimen. The user patient waits until the countdown goes to zero, aligns a pill, tablet, capsule or other medication with the exit orifice 39 and uses gravity to drop it into the toggle chute, and then presses the toggle 31 and button 27 simultaneously, to release a medication dosage. In an alternative embodiment, these two steps are programmed to be sequential instead of simultaneous, meaning that the user will first press button 27 and then press toggle 31 for medication release. The toggle 31 may optionally carry a legend, such as “PRESS HERE” to show the patient which part to depress for dispensing.

Figure 3A:
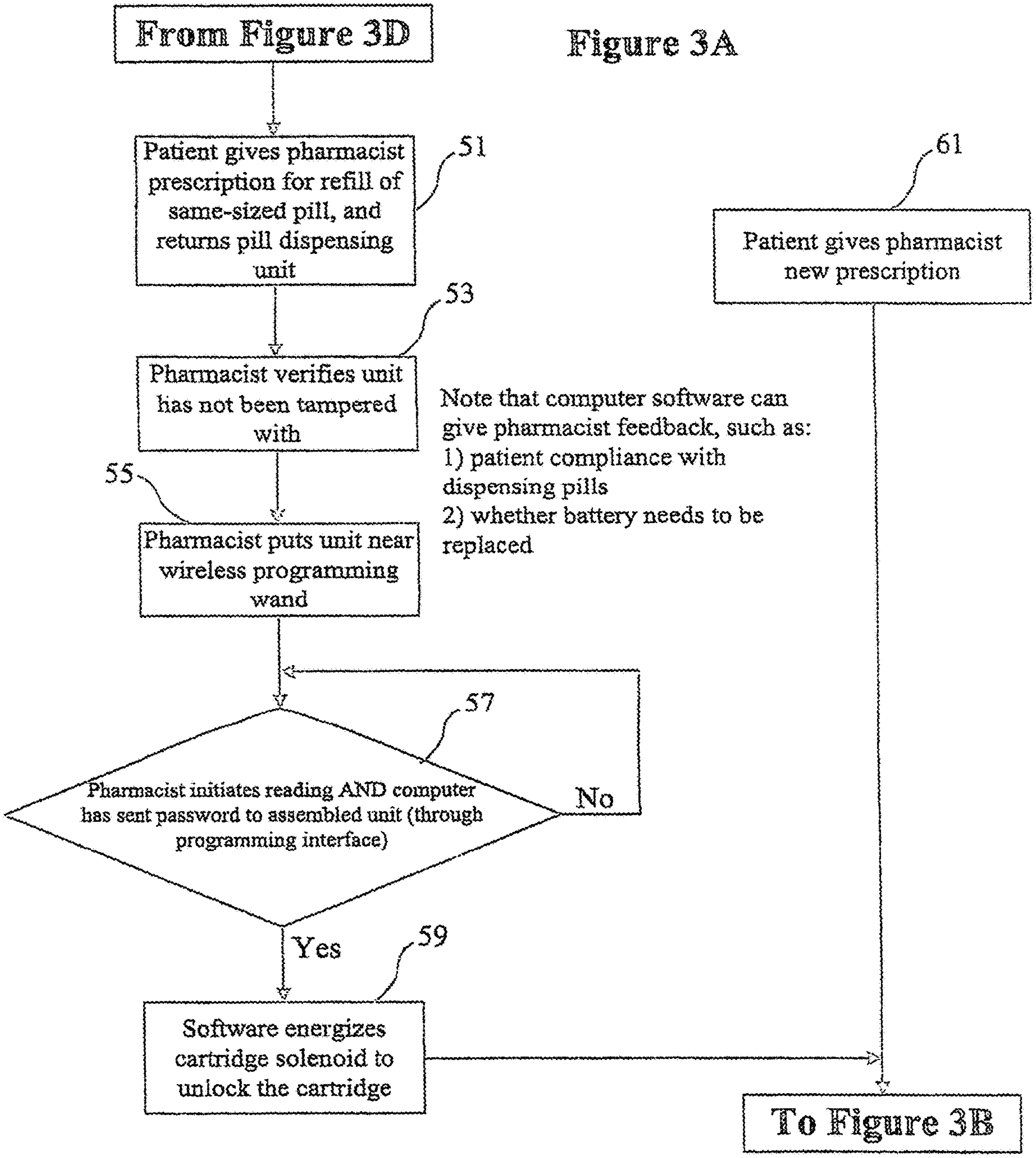
FIGS. 3A, 3B, 3C and 3D show a flow diagram of the steps involved in the utilization of some embodiments of the present invention programmable, refillable medication dispensers with scheduled metered medication unit dispensing.

FIGS. 3A, 3B, 3C and 3D show a flow diagram of the steps involved in the utilization of some embodiments of the present invention programmable, refillable medication dispensers with scheduled metered medication unit dispensing. In FIG. 3A, when a patient gives the pharmacy or dispensary a new prescription, Block 61, the steps begin on FIG. 3B. When it is a refill, the steps start at Block 51, wherein the patient turns in a script and the present invention dispenser with the spent cartridge. The receiver (pharmacist or other authorized re-filler) verifies that the device has not been tampered with, Block 53, and the pharmacist then puts the unit near a wireless programming wand, Block 55, and then initiates the reading of the dispenser and sends a code or password to the dispenser to unlock the cartridge lock, Block 57. Here, the pharmacist initiates the reading of the CPU in the dispenser to get identifier information and optionally to pick up other information, such as user compliance history and battery charge level, and then unlocks the cartridge with the computer software by activating the cartridge solenoid to withdraw a lock piston.

Figure 3B:
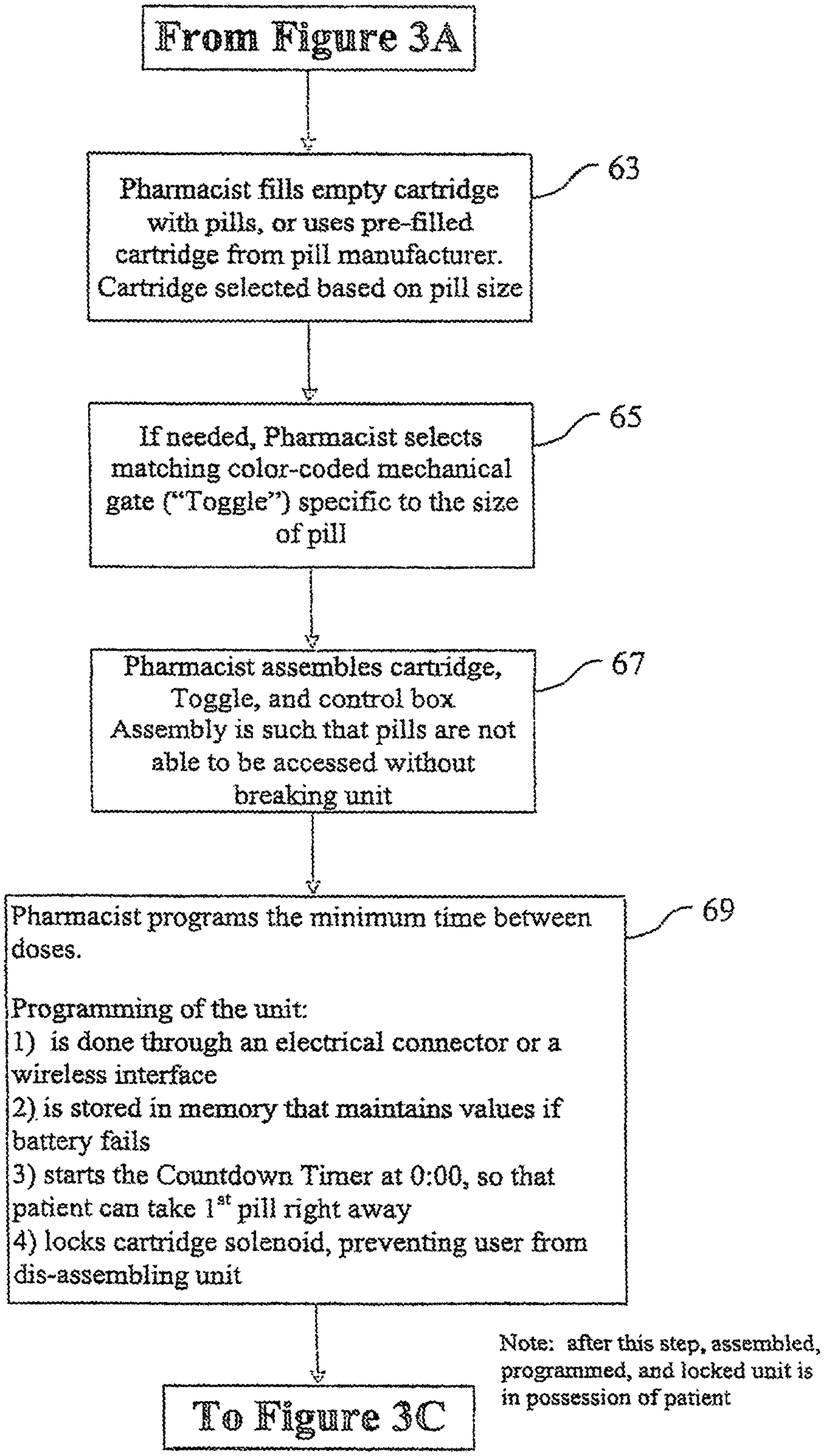

In FIG. 3B, the Pharmacist either fills the empty cartridge or procures a replacement/new cartridge with the correct medication (size/quantity), Block 63. The gate (toggle) may be color coded to match the cartridge so that a correct size toggle to match the medication size, is installed or has been installed on the dispenser, Block 65. The pharmacist assembles the cartridge (box), dispenser and toggle (gate) correctly to prevent unauthorized (untimely) use, Block 67. The pharmacist programs the minimum times between dosages and then locks the dispenser and the cartridge, and the countdown clock preferably begins at zero.

Figure 3C:
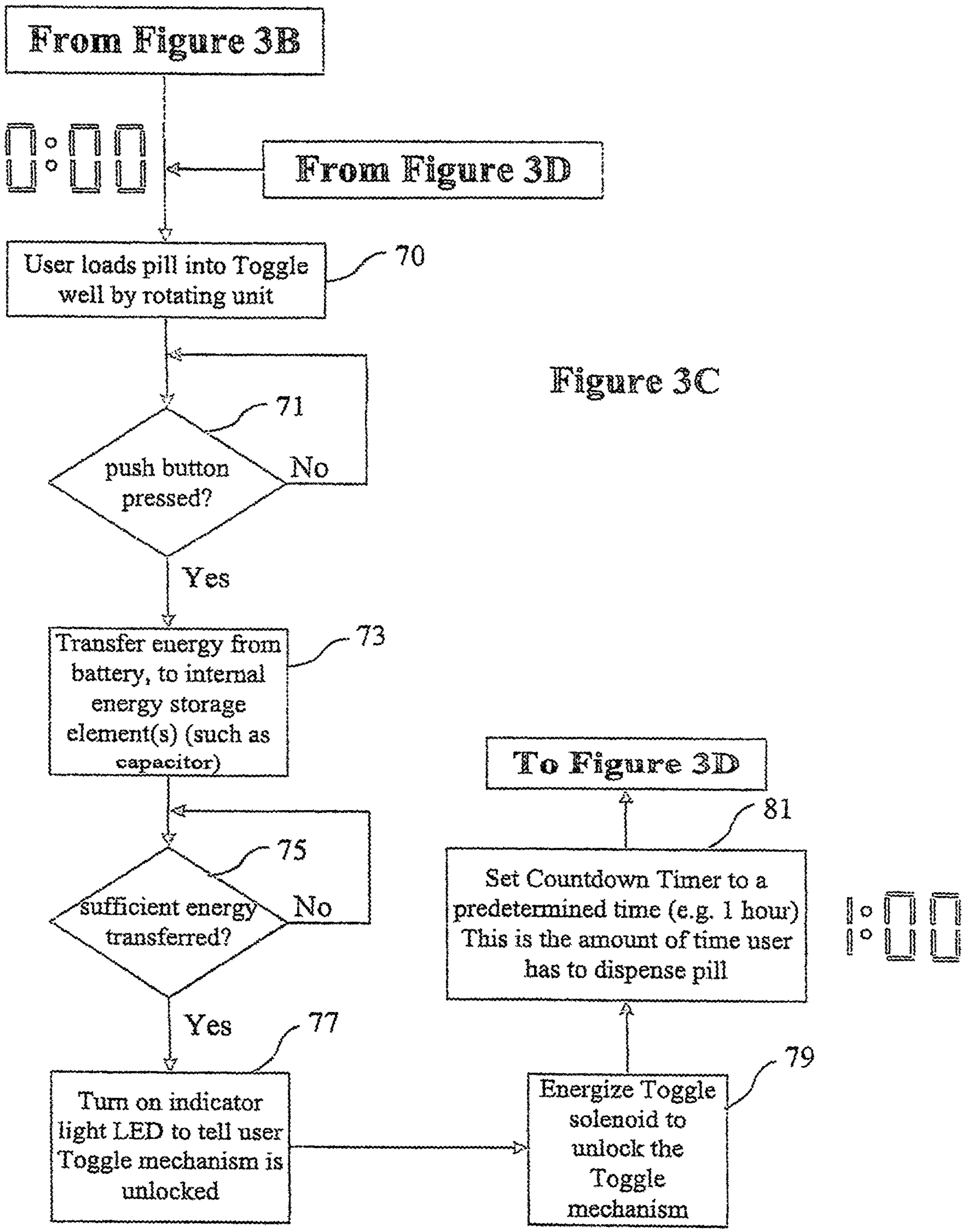

In FIG. 3C, the countdown timer has elapsed to time 0:00 (dispensing time). The user possesses the present invention cartridge and presses the CR button, Block 71, which causes the transfer of energy from the battery to internal energy storage components, Block 73. If sufficient energy is transferred, Block 75, then the LED indicator light will illuminate, Block 77, to tell the patient user that the toggle has been unlocked. The toggle solenoid is energized and unlocks the toggle lock, Block 79. The countdown timer will maintain a zero time for a specified, preselected time frame, such as one hour, Block 81, and the patient user must dispense before the zero time window expires.

Figure 3D:
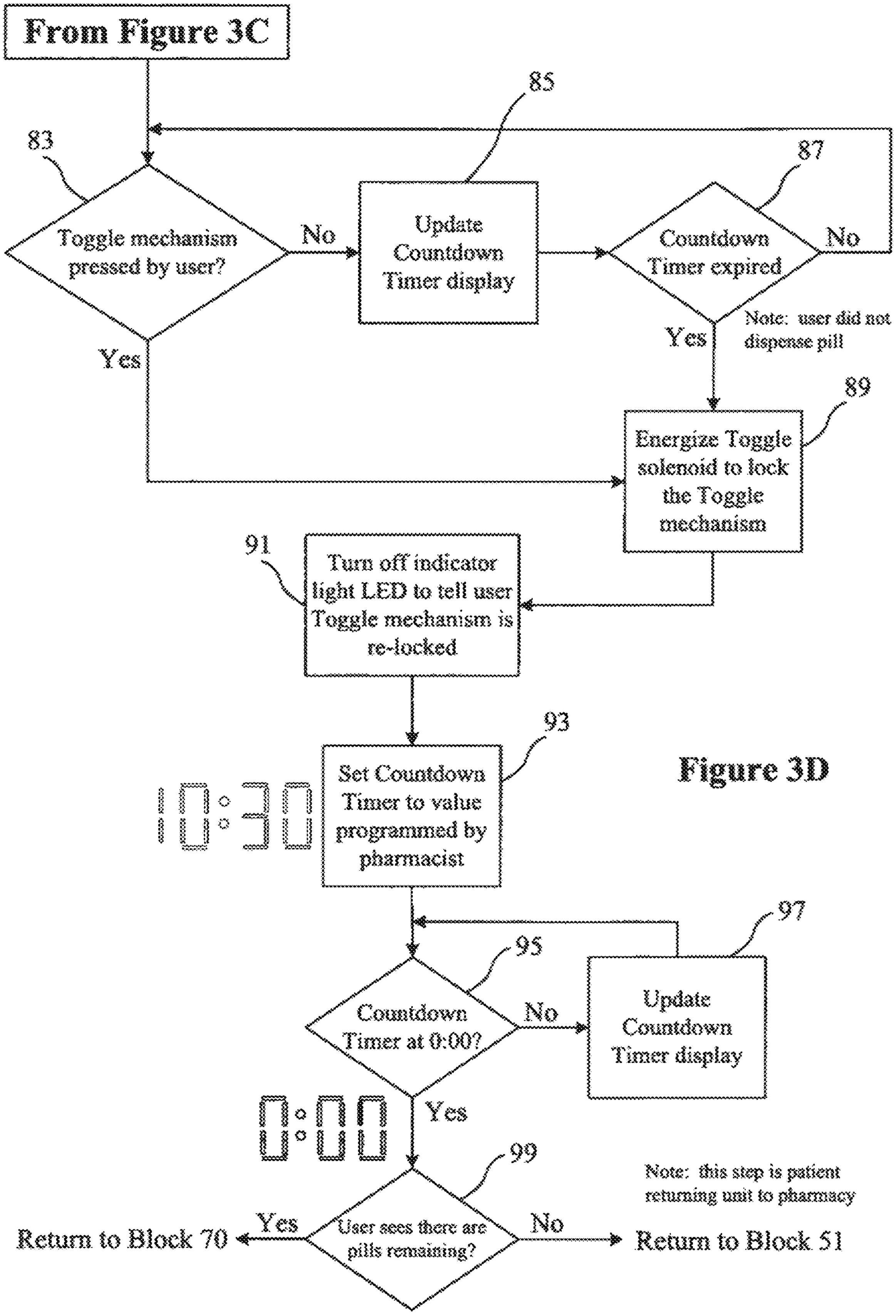

In FIG. 3D, the continued steps of the patient user are presented. The toggle is pressed by the user or not within allotted time frame, Block 83. If yes, the user dispenses a medication and releases the pressing. Then the toggle solenoid locks the toggle, Block 89, until the new countdown reaches zero again. If the user does not press the toggle within the allotted time, the countdown timer is updated, Block 85, based on the countdown time expiring, Block 87, and the toggle solenoid is energized to lock the toggle, Block 89. The indicator light turns from red to green or shuts off, Block 91, and the countdown timer begins its new countdown (for example, if the medication regimen calls for taking a dose every eight hours, the clock will count down from 8:00), Block 93. If the countdown timer is not at zero, Block 95, then the countdown timer is running (updated), Block 97. When the countdown timer reaches zero, the user sees that there are or are not any pills remaining, Block 99. If no pills are remaining, return to Block 51. If pills are remaining, return to Block 71.

Figure 4:
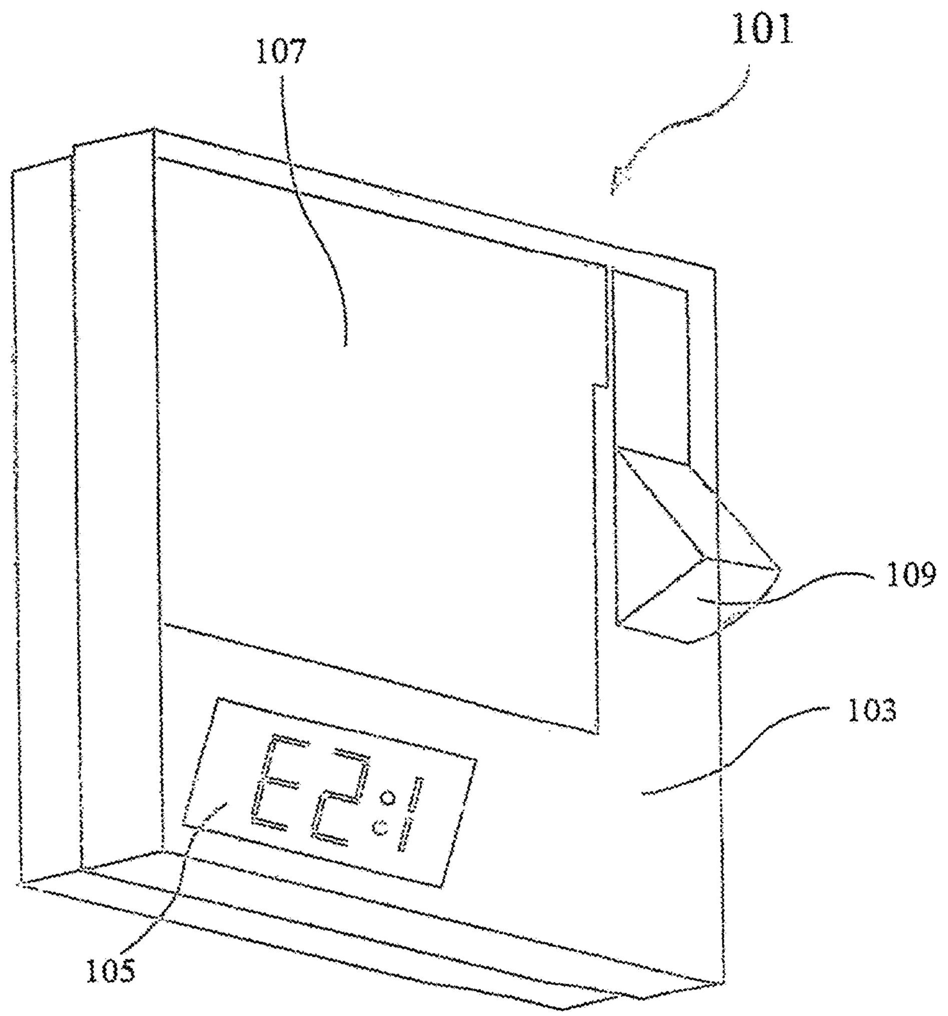
FIG. 4 shows a top oblique view of another embodiment of a present invention programmable, refillable medication dispenser with scheduled metered medication unit dispensing

FIG. 4 shows a top oblique view of another embodiment of a present invention programmable, refillable medication dispenser 101 with scheduled metered medication unit dispensing and without a child resistant button or other CR feature. Dispenser 1 includes a main housing 103, a countdown timer 105, a locked multidose medication cartridge 107, and a toggle 109. This dispenser 101 operates in the same manner as the ones described above, except that there is no CR button depression required for dispensing. When timer 105 goes to zero, the user will simply proceed to press the toggle to raise up the dispensing chute in the toggle 109 and tilt to dispense.

Figure 5:
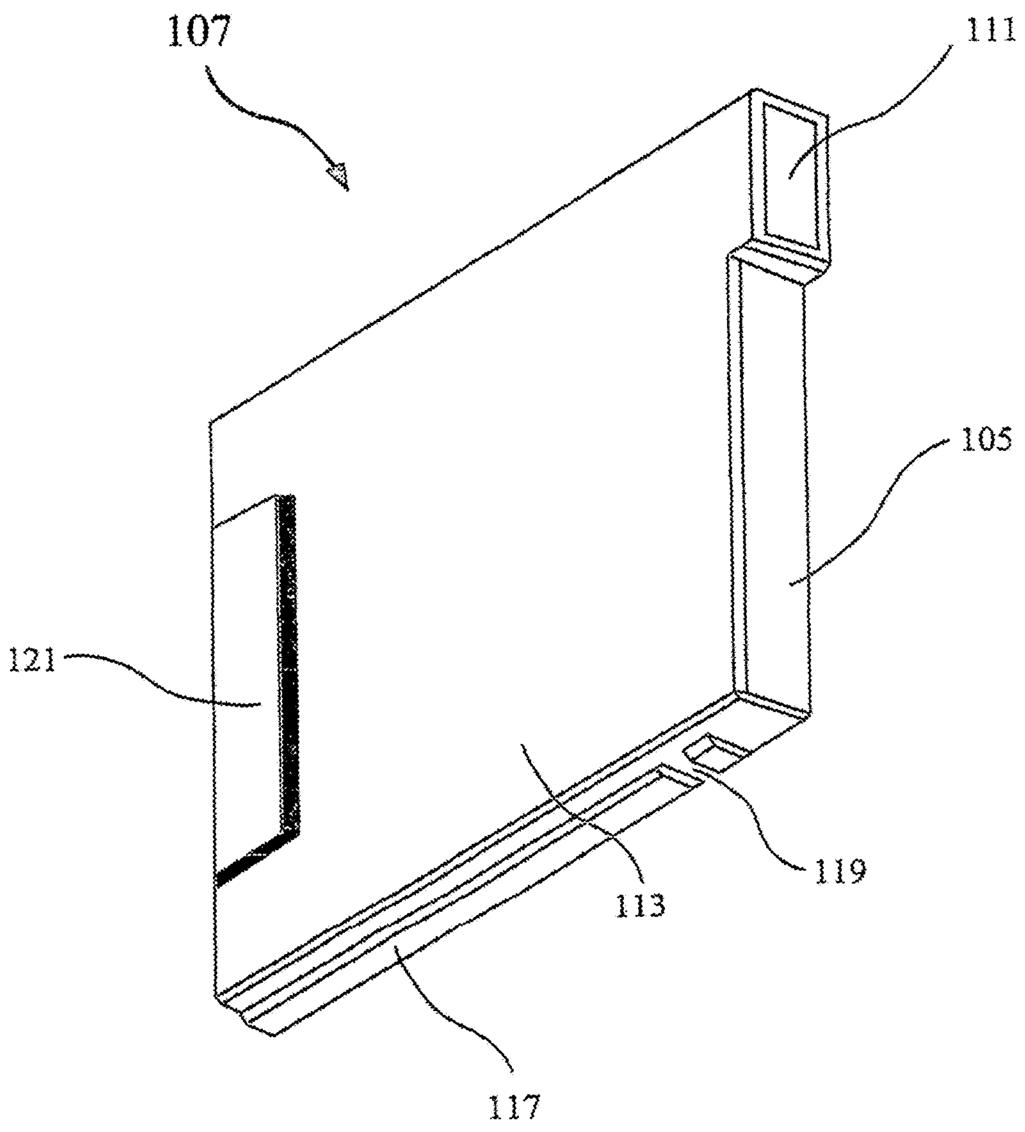
FIG. 5 shows details of the medication cartridge in the FIG. 4 dispenser.

FIG. 5 shows details of the medication cartridge 107 in the FIG. 4 dispenser 101. Cartridge 107 includes a housing with a top 113 with grip 121, a side 117, with a piston lock receiver slot 119 and a front 115 with a dispensing orifice 111 that would align with the toggle chute of dispenser 101. There are two locks, not shown, in this arrangement, one to lock the toggle 109 until the timer 105 counts down to zero, at which time the solenoid for that lock would be activated to retract the piston lock to permit toggle chute dispensing, and a second lock to retain the cartridge 107 in the dispenser 101 until a pharmacist or other professional desired access to fill or refill a prescription.

FIGS. 6, 7, 8, 9, 10 and 11 show side cut views of a sequence of steps involving the medication release control gate (toggle) as controlled by the central processor, its solenoid and a patient user, to properly dispense a medication unit in a timely fashion. A detailed discussion is now presented on this sequence:

The toggle 31, shown in FIGS. 2A and 2B above, is controlled by the central processor unit 38 based on the preprogrammed timer chip which in turn maintains or releases the toggle lock which here in these FIGS. 6 through 11, is solenoid 35. Thus, the toggle lock solenoid 35, is kept in its locked position until the clock 36 (operated by the timer chip) arrives at the dispensing time for the patient user. The clock may be a true time clock, but is preferred to be a countdown clock so that a patient user may readily see how much time must pass before medication is permitted. When it arrives at a dispensing time, the central processor unit 38 sends a signal to activate solenoid 35 (withdraw the piston lock) to permit toggle 31 movement and thus permit medication dispensing. The details are shown sequentially in FIGS. 6, 7, 8, 9 and 10. In each of these Figures, there are the following identical components: toggle 31, toggle dispensing chute 32, spring 34, solenoid 35, countdown clock 36, central processing unit 38, dispenser device 40, toggle pivot axle 42 and toggle closing sensor 43. (In some of these Figures, tablet 44 is shown.) Spring 34 pulls the toggle 31 down at the toggle chute 32 side so that toggle chute 32 is below the surface of the dispenser device 40 main body.

Figure 6:
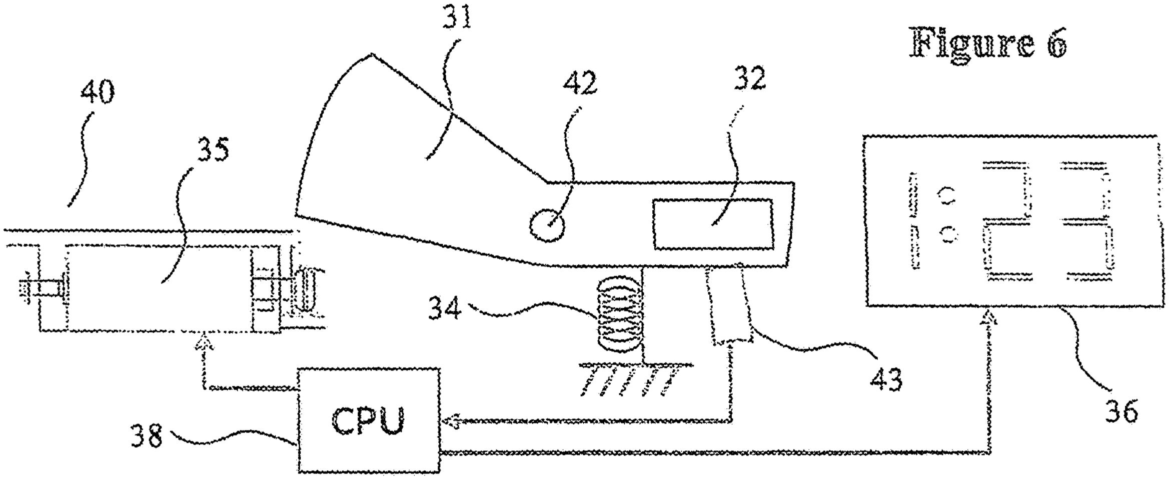
FIGS. 6, 7, 8, 9, 10 and 11 show side cut views of a sequence of steps involving the medication release control gate (toggle) as controlled by the central processor, its solenoid and a patient user, to properly dispense a medication unit in a timely fashion.

In FIG. 6, the clock 36 shows that there is 1 hour and 23 minutes yet to pass before dispensing can occur. At this time, the solenoid piston lock is in the extended position and, therefore, locks toggle 31 into its rest position. If a user were to depress the left side of toggle 31 to raise up chute 32 for dispensing, it would be stopped by the piston lock and access would be denied.

Figure 7:
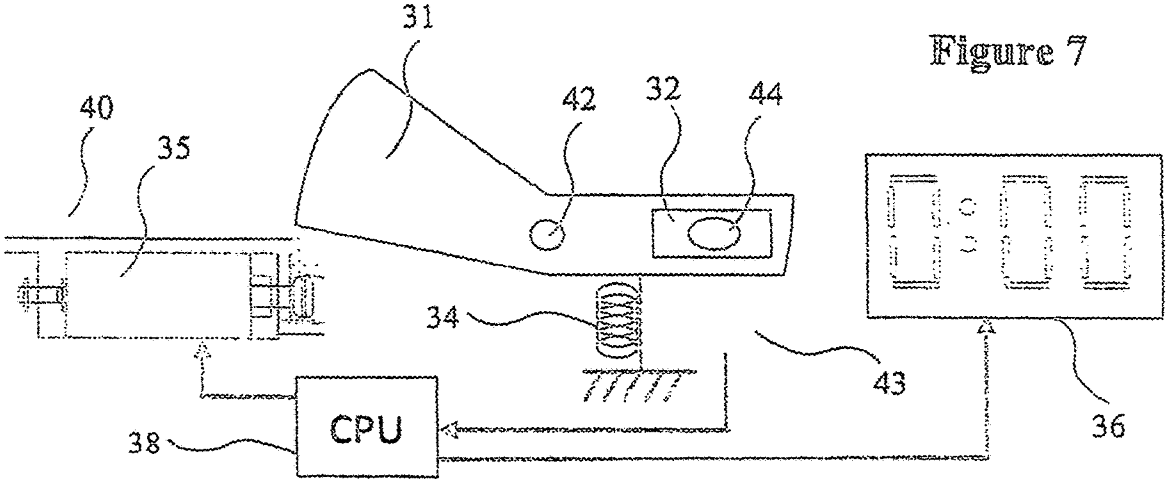

In FIG. 7, the clock 36 shows a time of zero, meaning that the user can now dispense a medication unit. At this point, the user may tilt the dispenser to move a medication unit 44 (pill or capsule) into the chute 32. If the dispenser has a safety button or other child resistant feature, the user will now depress that and then may proceed to depress the toggle 31 to dispense.

Figure 8:
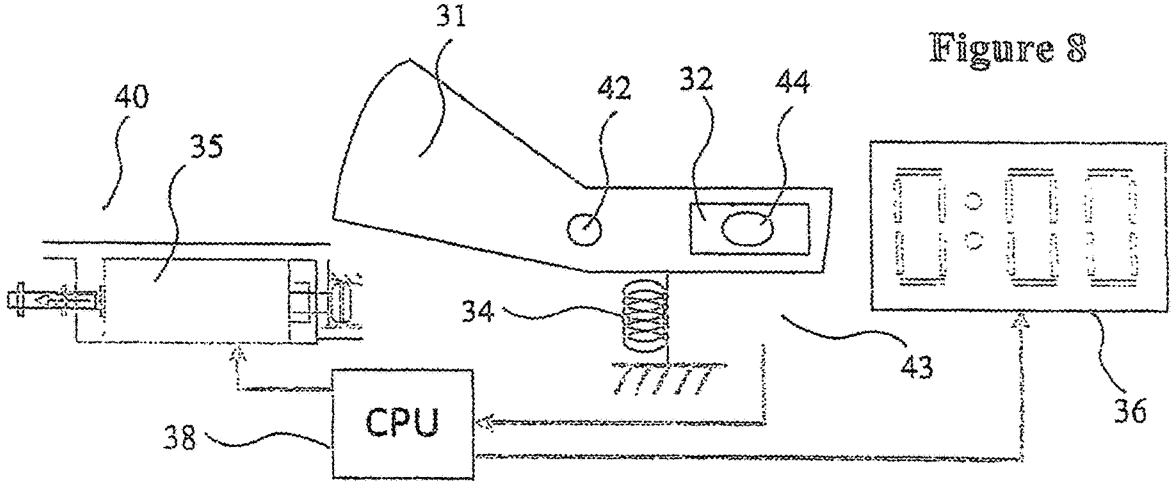

In FIG. 8, the toggle 31 is up, on the left, but the solenoid 35 has opened the lock. See the left arrow showing the piston lock withdrawn.

Figure 9:
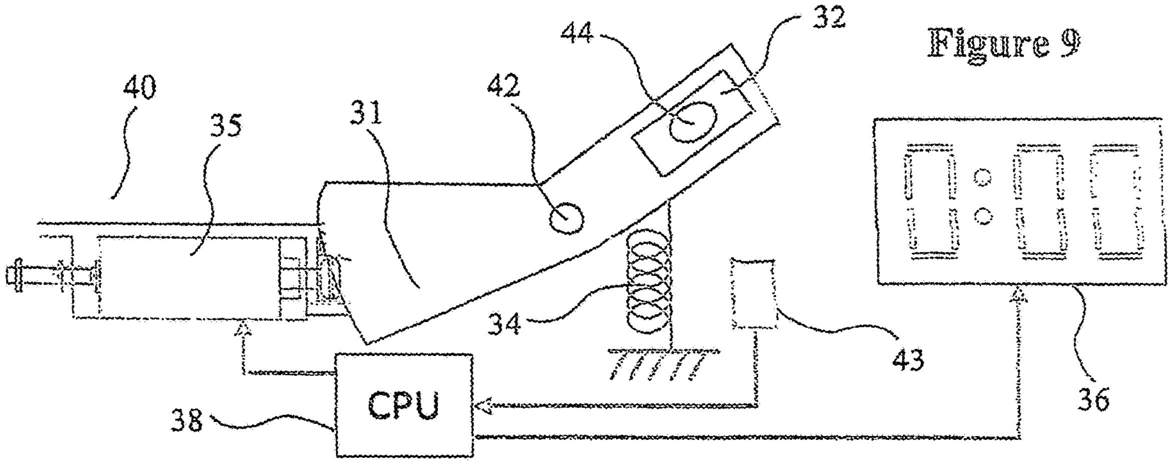

In FIG. 9, the user has depressed the left side of toggle 31 to raise the chute 32 above the surface of the dispenser to expose and permit removal of the medication unit 44. In preferred embodiments the raising and lowering of the chute 32 is recognized by a bottom sensor and this restarts the clock and initiates re-locking of the toggle. In other embodiments, after a preset amount of time has passed with the clock at zero, the timer is restarted and the sequence repeats itself.

Figure 10:
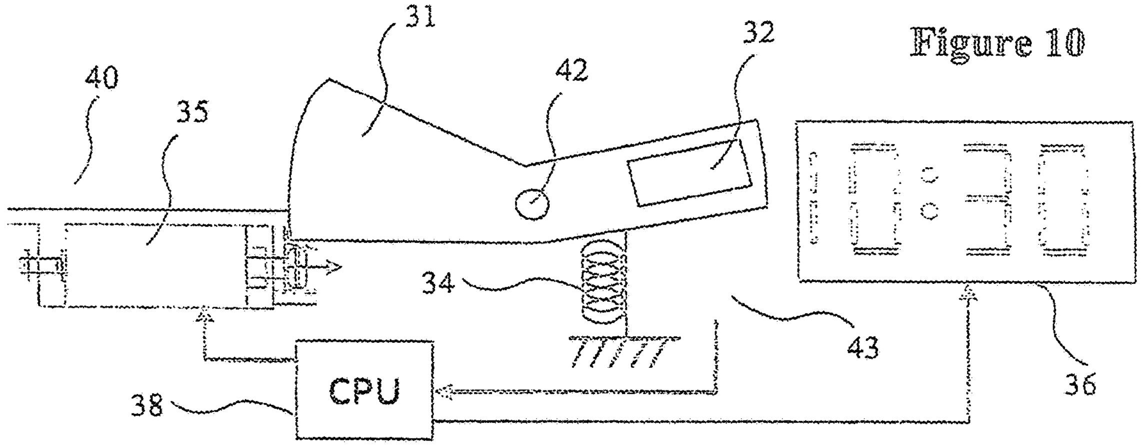

In FIG. 10, after the user has raised chute 32 and removed medication unit 44, the user releases the depression and spring 34 is pulling the toggle 31 back to its rest position, again blocking chute 32. In this FIG. 10, the solenoid is extending the piston lock as the clock 36 has restarted. (As an alternative, a spring could be located on the opposite side of the toggle in these present invention embodiments, and push up on the toggle (again to create a rest toggle position with no access to the toggle chute by a user), in lieu of pulling down on the other side of the toggle).

Figure 11:
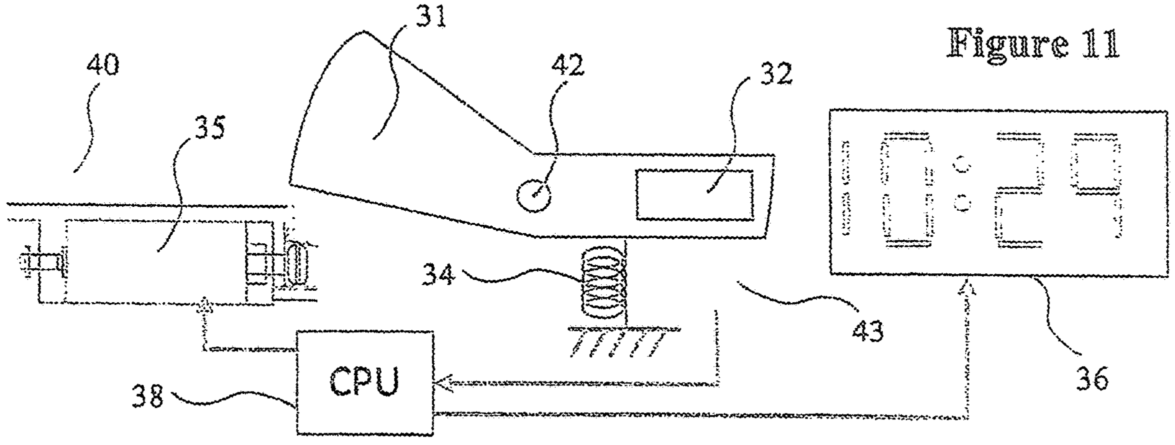

When toggle 31 is released and returns to its rest position, sensor 43 sees the toggle close and signals for toggle locking and timer restart. In FIG. 11, the piston lock is again fully extended and the toggle 31 is locked so as to prevent medication dispensing and clock 36 is counting down to the next dispensing opportunity.

The mechanisms shown in FIGS. 6 through 11 are exemplary and in place of a toggle gate, a flap gate or dispenser lid could be used, and would be locked and prevented from being opened, except at the prescribed times.

Figure 12:
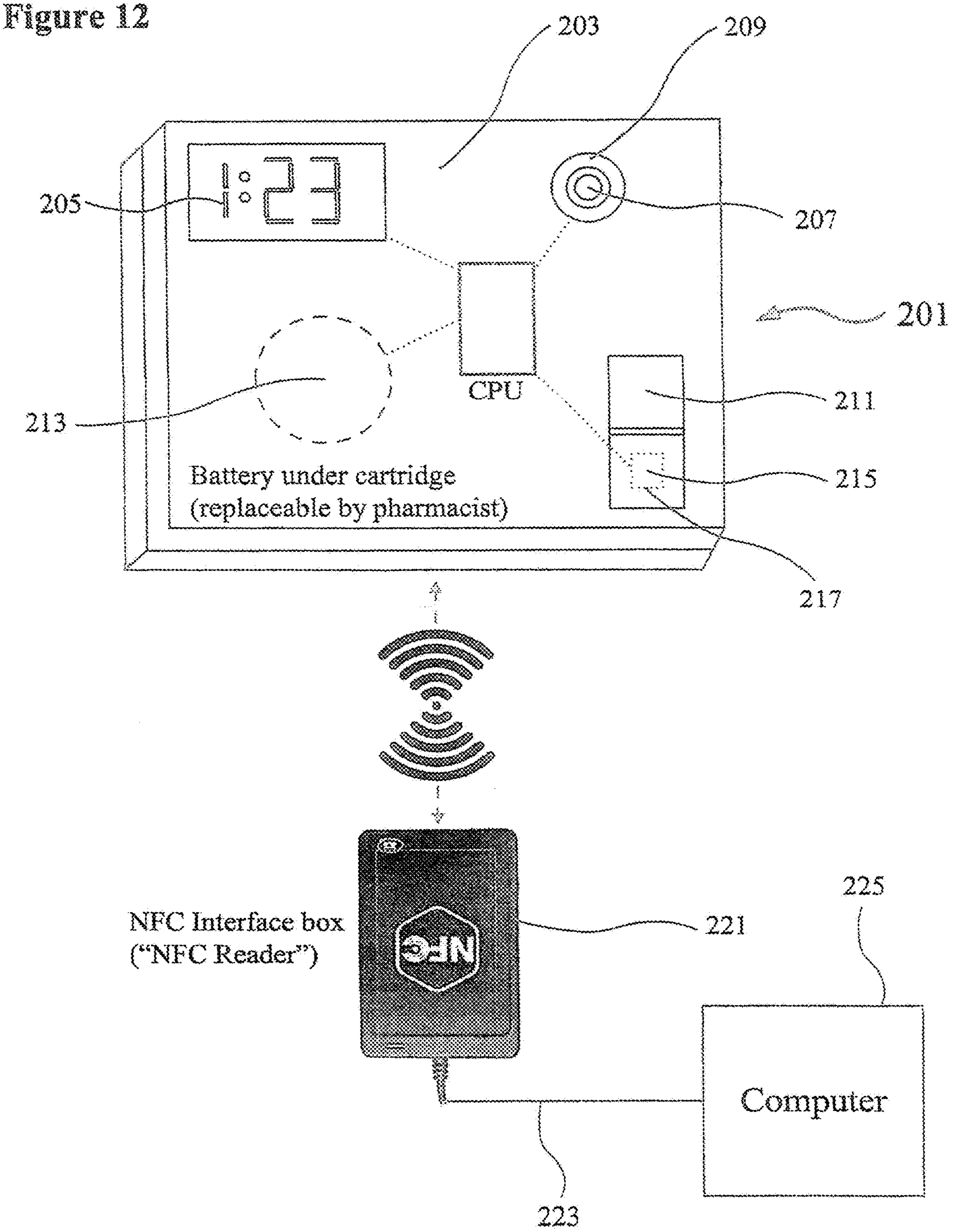
FIG. 12 shows a top view of the present invention programmable, refillable medication dispensers with scheduled metered medication unit dispensing, in the context of system components used at a control point, such as a pharmacy or nursing home or opioid dispensary.

FIG. 12 shows a top view of the present invention programmable, refillable medication dispensers with scheduled metered medication unit dispensing, in the context of system components used at a control point, such as a pharmacy or nursing home or opioid dispensary. Present invention dispenser 201 has a main housing 203 with a cartridge inside (not shown), as well as a clock 205, a CR bypass button 207, an indicator light 209, a toggle 211 with a push down end 217 that is maintained upwardly by an opposing spring (not shown), and a contact switch 215 that senses and signals when the push down end 217 has been depressed, to signal a medication dispensing event (to reset the timer and the toggle lock). In this version of the present invention dispenser 201, the battery is also locked by being blocked by the cartridge, which makes the system more secure in that only the pharmacist or other authorized party can remove/replace the battery.

In FIG. 12, there is also a desktop (or other computer) 225, used by the pharmacist, with connection 223 to an NFC (non-contact frequency connector, aka near-field communication) reader 221. This reader establishes a wireless connection between the computer 225 and the dispenser 201, so that the pharmacist can unlock the cartridge, refill it, program the dispenser CPU and reset the time in accordance with the patient's prescription. It should be noted that this arrangement may also include a battery (and/or other energy storage components) recharge step using wireless recharging of the dispenser's battery 213 (or other component, such as a pharmacist-enabling capacitor).

Figure 13:
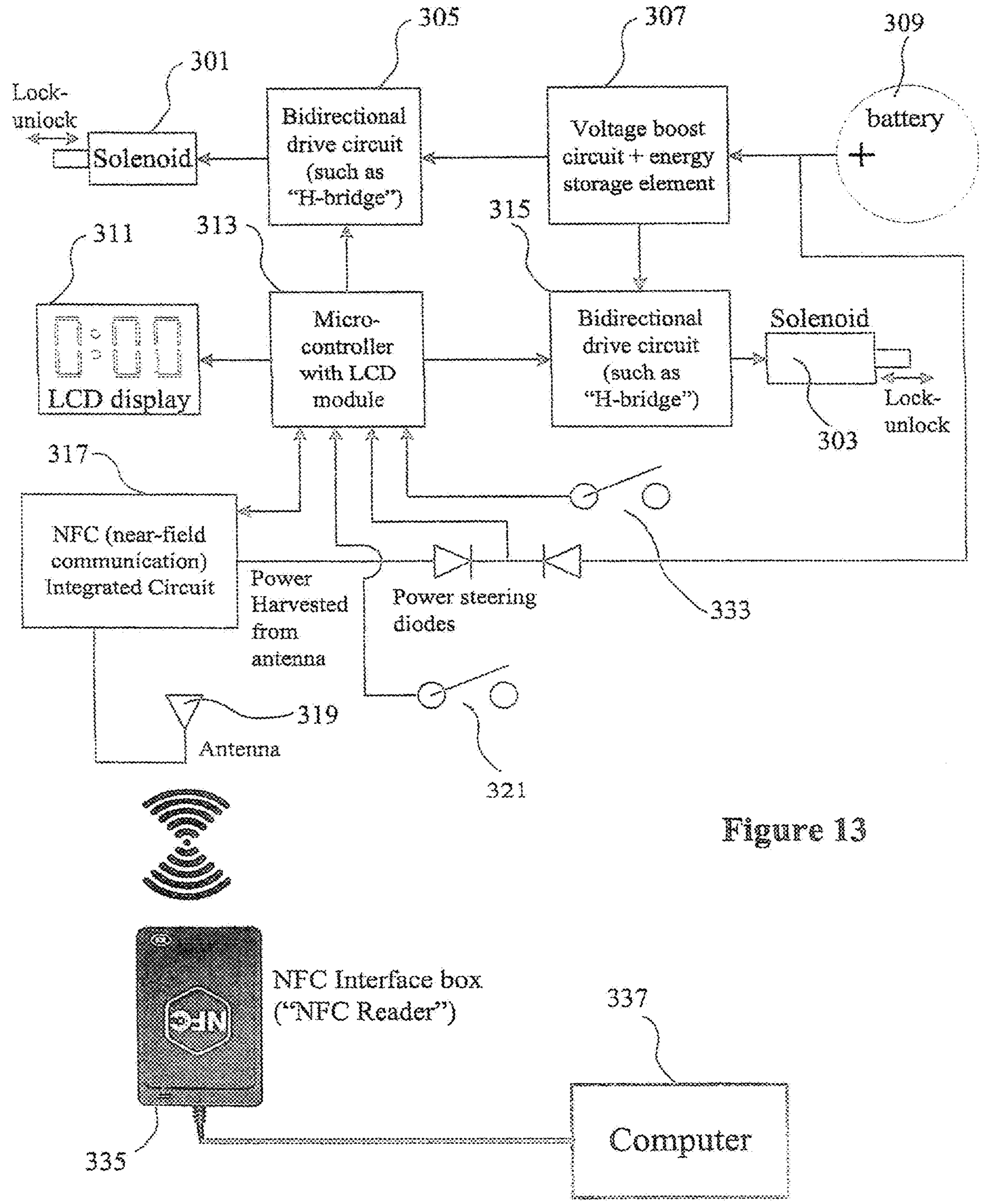
FIG. 13 shows a block diagram of an embodiment of the present invention device as used in conjunction with a communications device (NFC Reader) and a programming computer, such as are shown in FIG. 12.

FIG. 13 shows a block diagram of an embodiment of the present invention device as used in conjunction with a communications device (NFC Reader) and a programming computer, such as are shown in FIG. 12. This diagram excludes the cartridge main housing, the toggle and the cartridge, but the components are positioned to be consistent with the prior drawings that show these missing components. Solenoid 301 is used to lock and unlock the cartridge for filling or refilling a prescription. It is controlled by a voltage boost circuit 307 connected to battery 309, and by the microcontroller module 313 and bidirectional drive circuit 305.

In FIG. 13, solenoid 303 is used to lock and unlock the gate, such as a toggle or lidded dispensing chamber, in accordance with clock 311. It is controlled by the microcontroller with LCD module 313, including its internal, programmed dispensing clock (countdown displayed by clock 311), by a voltage boost circuit 307 connected to battery 309, by bidirectional drive circuit 315 and by sensor button 333. Module 313 is also connected to NFC circuit 317, which in turn receives power and instructions from NFC reader 335, connected to computer 337. There is also a CR button 321 and power steering diodes 323 and 325. (Note that to connect the pharmacist's computer to the dispensing device for communications, programming and time setting, alternatives and equivalents could be used in place of the NFC interface device, such as WIFI, Blue Tooth, USB connector or other wireless or wire based connections.)

FIGS. 14A, 14B, 14C and 14D show a flow diagram of the steps involved in the utilization of other embodiments of the present invention programmable, refillable medication dispensers with scheduled metered medication unit dispensing.

Figure 14A:
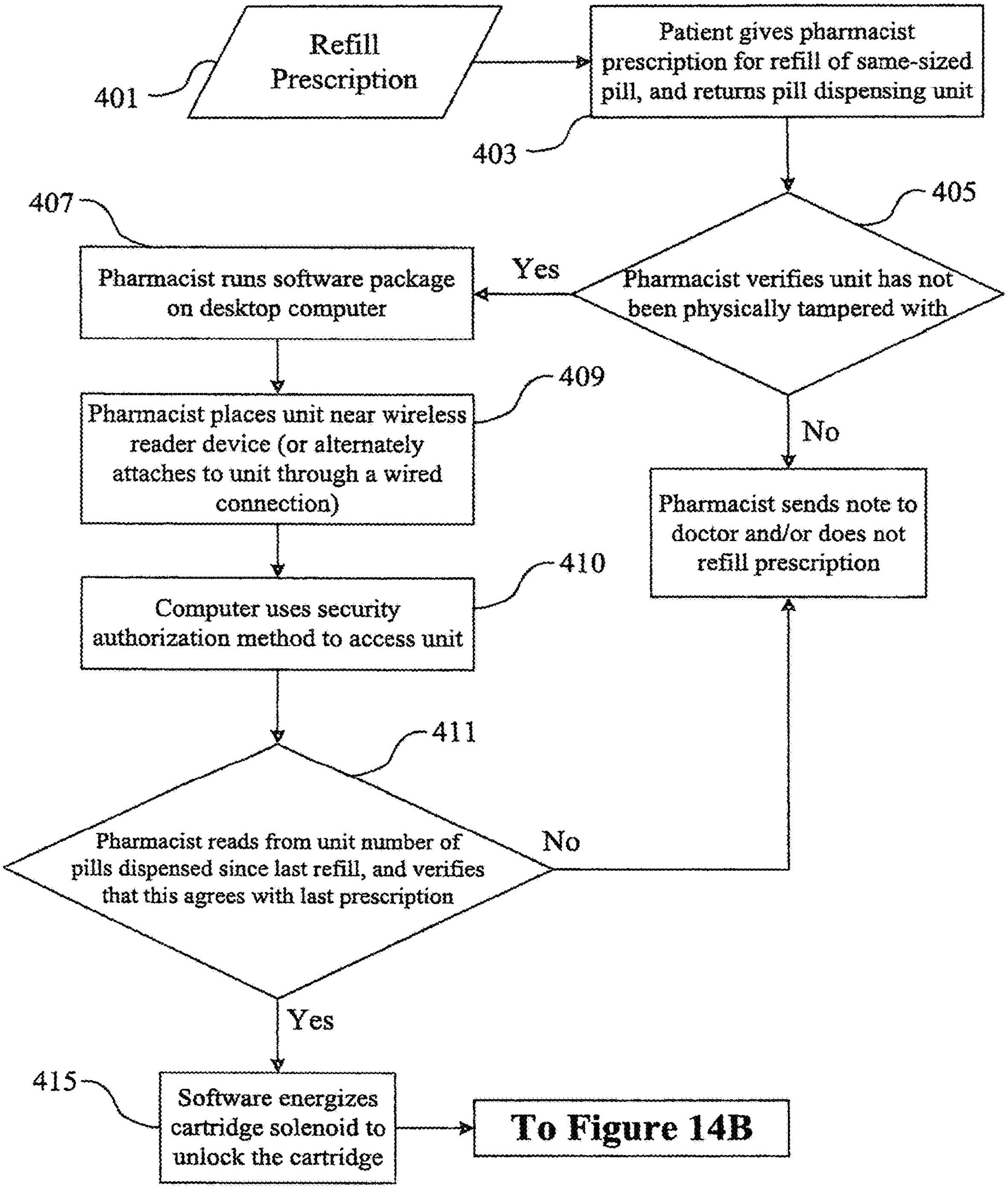

In FIG. 14A, the user has exhausted the medication in a present invention dispenser, such as those described elsewhere herein, and seeks to refill the prescription, block 401. The patient delivers the dispenser to the pharmacist for a refill of the same medication (same formulation and same size pill or tablet), block 403. The pharmacist verifies that the dispenser has not been damaged or tampered with, block 405. If yes, it has not been damaged or tampered with, proceed to block 407. If it has been damaged or tampered with, the pharmacist does not refill the prescription and notifies the prescribing doctor, block 413, wherein the doctor may require a visit by the patient before rewriting, refuse to rewrite, make alternative recommendations to the user, such as rehab, etc. If the dispenser has not been damaged or tampered with, the pharmacist uses the related software on his computer (which may be his phone, laptop, desktop, notebook or other PDA), block 407. The pharmacist connects the dispenser to his computer (wirelessly or by wire connection), block 409. At this point, the pharmacist uses security authorizations to access the dispenser, block 410. This is an alternative to above and may involve one or more than one security step. There is recognition of the device to the pharmacist's software package, and this involves CPU identification. Here, there may also be a systems security aspect, such as independent verification of the authenticity of the prescription. For example, regional hospitals now link with doctors in their area and share patient information (in a HIPPA-compliant manner). In that way, a general practitioner, a pain management doctor, an orthopedist and a treating psychologist may all simultaneously know that the patient is getting a refill. Next, the pharmacist confirms the number of dosages to be dispensed and verifies it, block 411. If the confirmation is not correct, then return to block 413, as elaborated upon above. In some cases of the present invention devices, as here, the cartridge is unlocked by energizing the cartridge solenoid at the time of need, to save battery life. Thus, the next step, energizing the cartridge solenoid, is automatically done by the software upon confirmation by the pharmacist, block 415. Next steps are shown in the next Figure.

FIG. 14B, left column, these next steps are sequential. As an optional feature, the computer may "read" the battery and recommend a recharge or a battery replacement, block 429. The pharmacist fills the empty cartridge with the correct quantity of medication, such as pills, and returns the filled cartridge (or a replacement cartridge) to the dispenser unit, block 431. If needed, a new toggle may also be inserted (if, for example, the pill size has been changed by the manufacturer or the doctor has increased or decreased individual dosages: example, warfarin 5 mg is much larger than warfarin 1 mg), block 433. The cartridge is locked in by the computer signal initiated by the pharmacist, block 435. The pharmacist now programs the dispenser unit for the correct time lapse between dosages or confirms existing countdown settings, Countdown Reset Value, block 437. The pharmacist may set the countdown timer at zero to allow the user patient to take a dose right away, if appropriate, block 439, and gives the dispenser unit to the user patient, block 441.

FIG. 14B, right column, shows an additional set of pre-steps for a new prescription, at block 471 and up the column. Here, the patient gives the pharmacist a new prescription, block 473, and he runs the software package, and in some programs, inputs patient information, other id information (such as a hospital portal link) and the prescription, block 475. He may also check a connected or separate data base to see if there are any conflicts (such as the same script being filled yesterday at another pharmacy!). Next, he connects a new dispenser unit to his computer, either by wire or wirelessly, block 477, and obtains security authorization to proceed, block 479. The subsequent steps are already discussed above and these are set forth in blocks 429 through 441, supra.

Figure 14C:
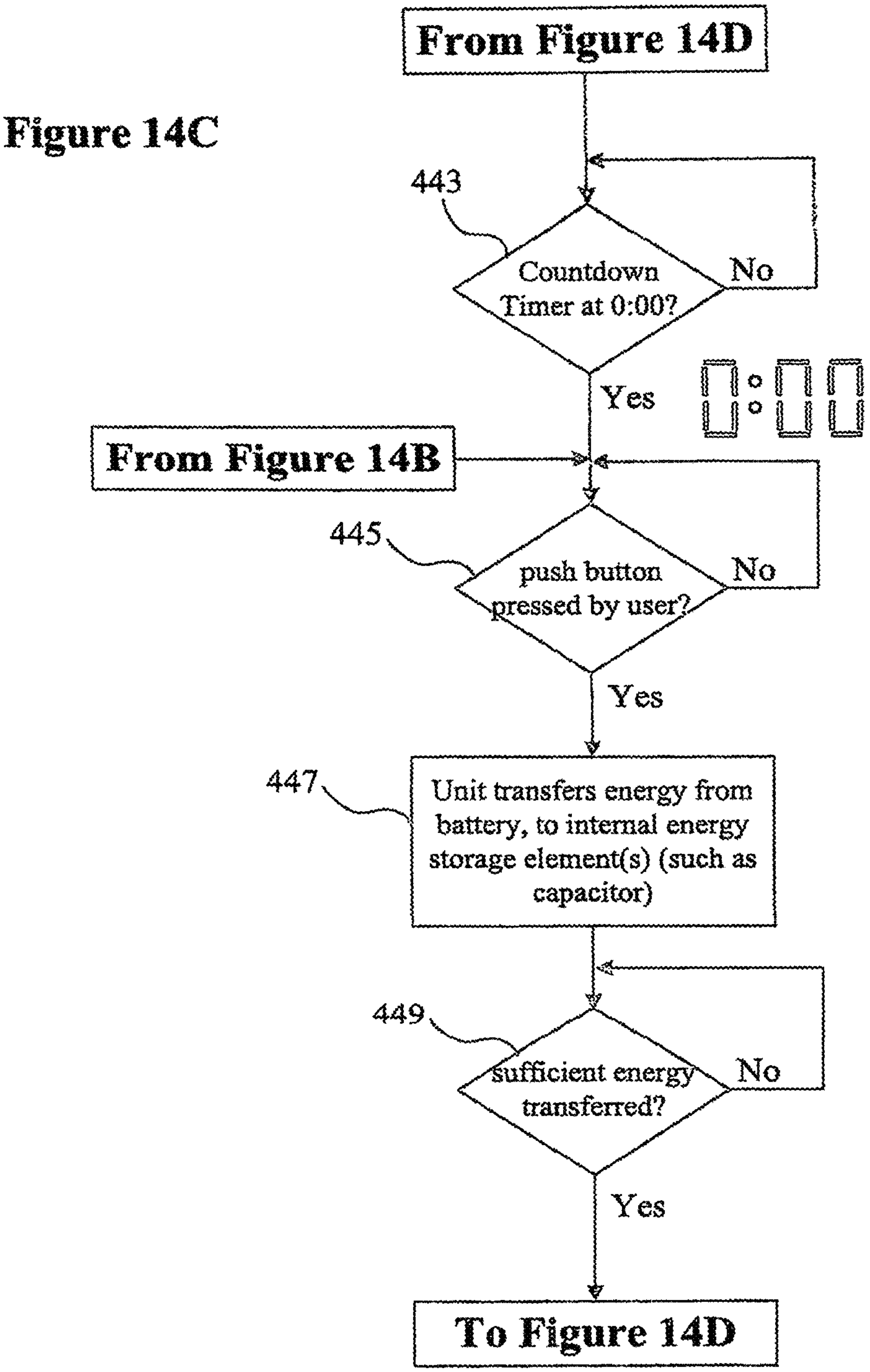
Figure 14D:
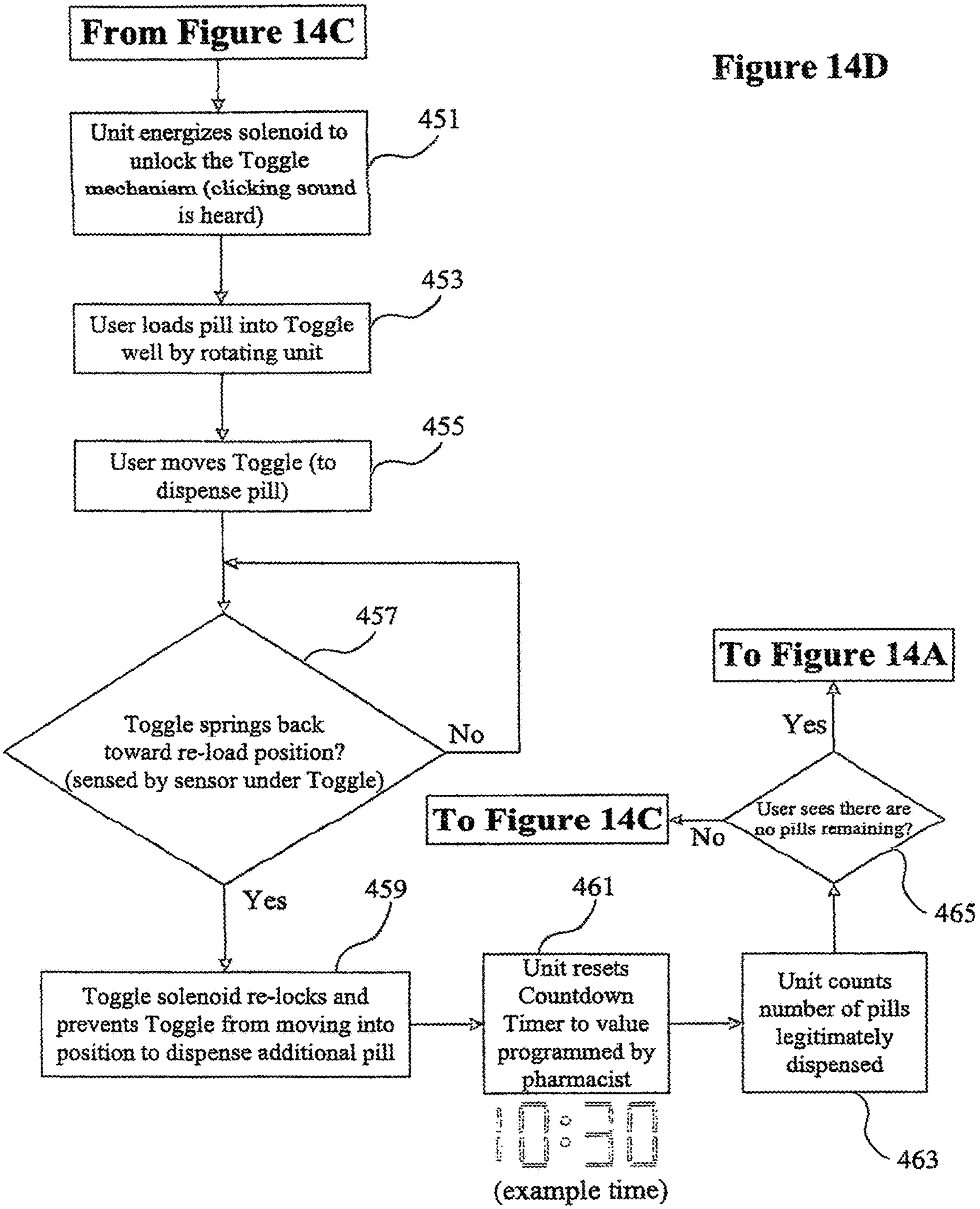

FIGS. 14C and 14D continue the flow diagram, are now discussed together, and address the steps involved after the patient has received his dispenser with medication. Is the countdown timer at zero, block 443? If not, the user must wait until it counts down to zero. When it is at zero, the user pushes the outside button, block 445, to initiate power from the battery to internal storage elements, block 447, and when sufficient, block 449, energizes the toggle lock solenoid, block 451. The user patient loads medication into the toggle chute by gravity by rotation, block 453, and then dispenses the medication by pressing the toggle, block 455. The toggle then returns to its rest position, block 457, wherein the toggle relocks by automatic solenoid activation, block 459, it cannot be used until the next countdown is completed. The countdown timer is reset in accordance with the programming set by the pharmacist, block 461. The dispenser unit may keep count of the number of pills dispensed, block 463, and when there are no pills remaining, block 465, the user patient commences the refill steps are set forth above.

Figure 15:
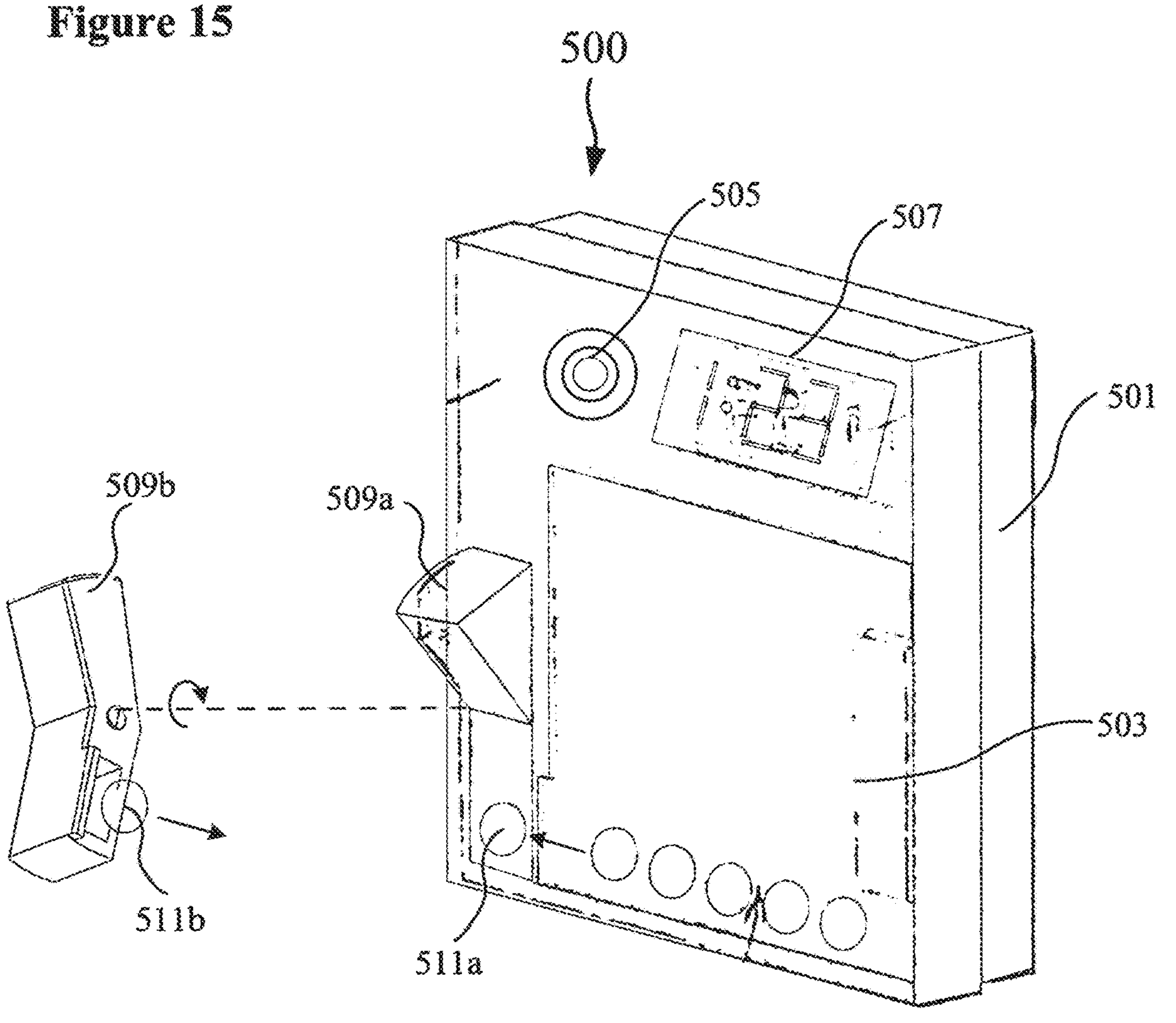
FIG. 15 shows an oblique front view of another embodiment of a present invention programmable, refillable medication dispenser with scheduled metered medication unit dispensing; and, FIG. 16 shows a top view of the present invention programmable, refillable medication dispenser with scheduled metered medication unit dispensing shown in FIG. 15, but with the CPU and solenoids shown.
Figure 16:
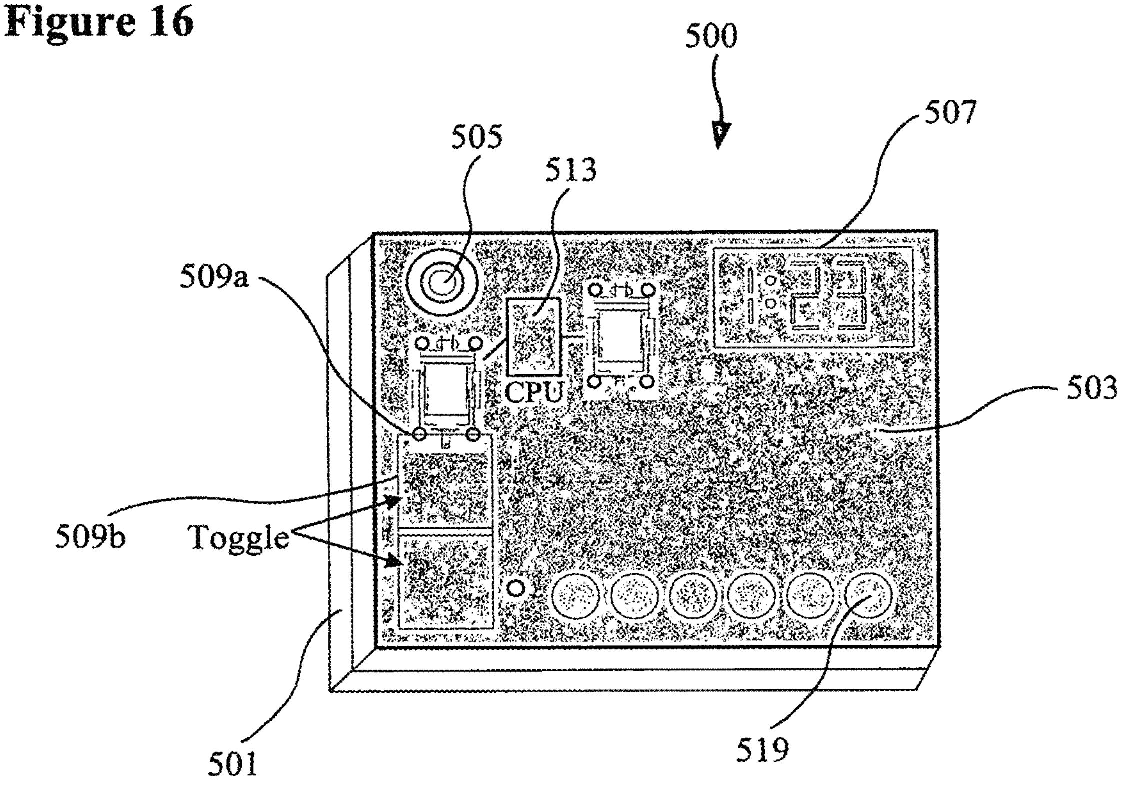

FIG. 15 shows an oblique front view of another embodiment of a present invention programmable, refillable medication dispenser 500 with scheduled metered medication unit dispensing, and FIG. 16 shows a top view of the present invention programmable, refillable medication dispenser 500 shown in FIG. 15, but with the CPU and solenoids shown. Dispenser 500 has a main housing 501, a clear plastic medicine cartridge 503, a user button 505, a timer 507 and a toggle, shown in place as 509*a* and removed with chute revealed, 509*b*. A loaded pill 511*a* is shown, as well as the same pill 511*b* in another position, now being dispensed from the chute of exposed toggle 509*b*. There is a hidden CPU 513, a toggle solenoid with lock 515 and a cartridge solenoid with lock 517. There are stored pills, such as pill 519, that can be seen through cartridge 503.

Figure 17A:
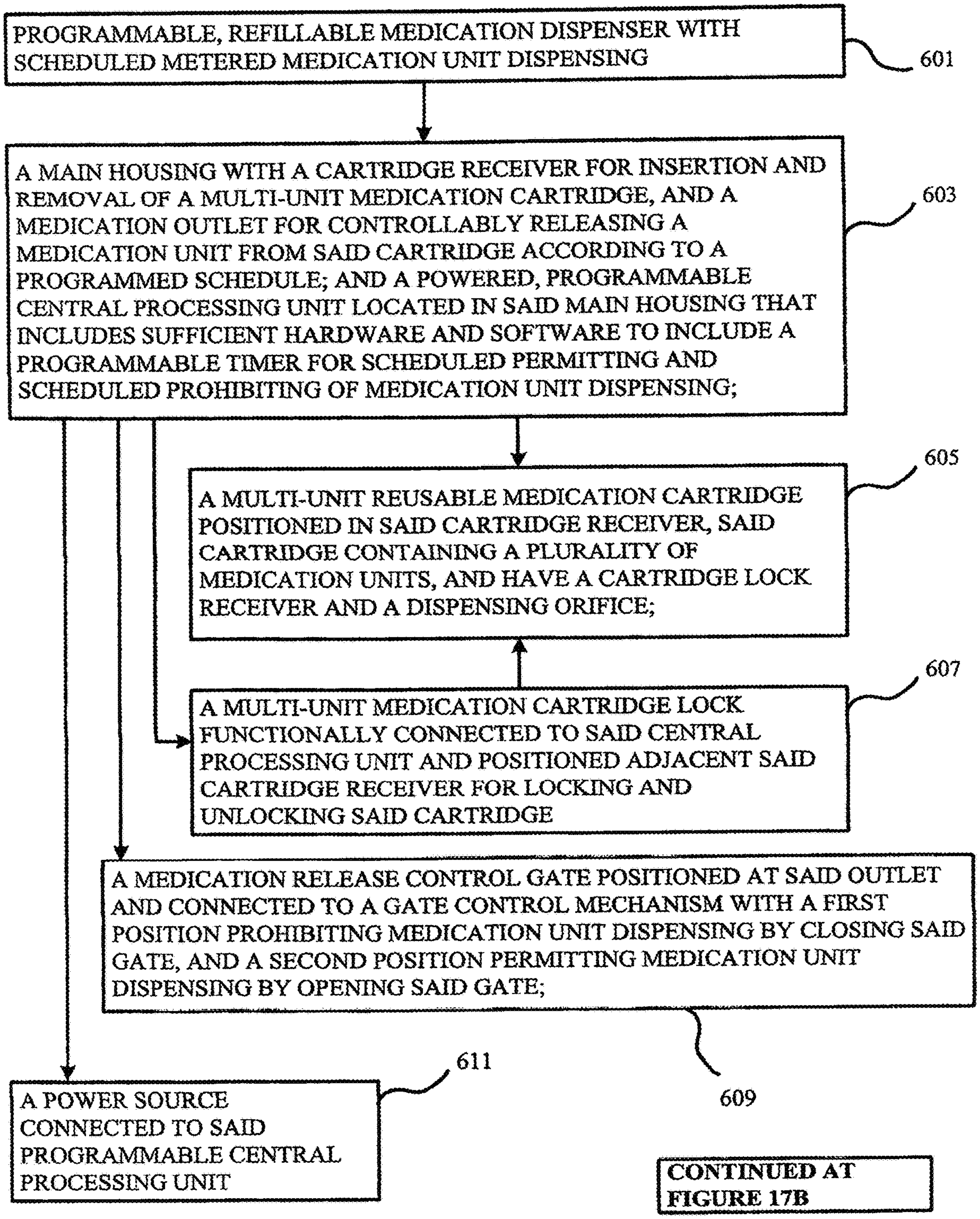
FIGS. 17A and 17B show a block diagram of various details of the present invention programmable refillable medication dispenser, including various alternative components and preferred options.
Figure 17B:
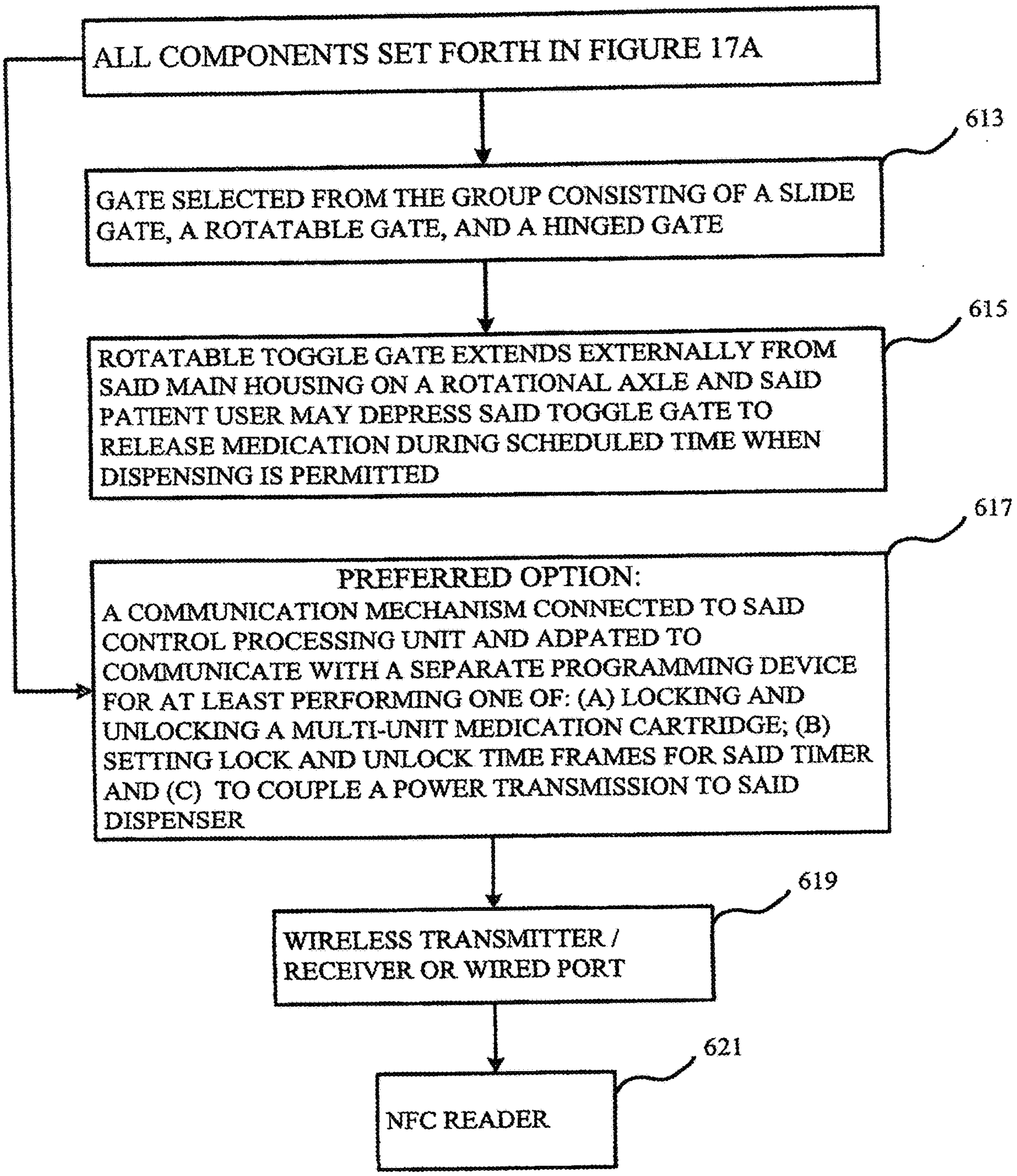

FIGS. 17A and 17B show a block diagram of various details of the present invention programmable refillable medication dispenser with scheduled metered medication unit dispensing, block 601, having a main housing having an outer structure with a cartridge receiver for insertion and removal of a multi-unit medication cartridge, and a medication outlet for controllably releasing a medication unit from the cartridge according to a programmed schedule, and having a powered, programmable central processing unit located in the main housing that includes sufficient hardware and software to include a programmable timer for scheduled permitting and scheduled prohibiting of medication unit dispensing, block 603. There is also a multi-unit medication cartridge positioned in the cartridge receiver, the cartridge containing a plurality of medication units, and having a cartridge lock receiver and a dispensing orifice, block 605. There is a multi-unit medication cartridge lock functionally connected to the central processing unit and positioned adjacent the cartridge receiver for locking and unlocking the cartridge, block 607, and a medication release control gate positioned at the medication outlet and connected to a gate control mechanism which has a first position prohibiting medication unit dispensing by closing the gate, and a second position permitting medication unit dispensing by opening the gate, block 609. There is also a power source connected to the programmable central processing unit, block 611. The gate may be selected from the group consisting of a slide gate, a rotatable gate, and a hinged gate, block 613, and in some preferred embodiments, the gate is a rotatable toggle gate, block 615, that extends externally from the main housing on a rotational axle and the patient user may depress the toggle gate to release medication during scheduled times when dispensing is permitted. A preferred option is a communication mechanism connected to the control processing unit and adapted to communicate with a separate programming device for at least performing one of: (a) locking and unlocking a multi-unit medication cartridge; (b) setting lock and unlock time frames for the timer and (c) to couple a power transmission to the dispenser, block 617. The communication mechanism may communicate via a wireless transmitter/receiver or a wired port, block 619, and a preferred mechanism is via an NFC reader, block 621.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, the actual shape of the main housing may be any of numerous possibilities as long as its functionality as described is not affected adversely.

What is claimed is:

1. A patient activated, programmable, refillable medication dispenser with internally scheduled metered, solid medication unit dispensing, having dual locks, a first lock for an inserted cartridge and a second lock for a dispensing gate, which comprises:

a. a main housing having an outer structure with a cartridge receiver for insertion and removal of a multi-unit solid medication cartridge, and a medication outlet for controllably releasing a solid medication unit from said cartridge according to a programmed schedule;

b. a powered, programmable central processing unit located in said main housing and outside of said cartridge, that includes sufficient hardware and software to include an internal programmable timer for scheduled permitting and scheduled prohibiting of medication unit dispensing;

c. a first lock, being a multi-unit medication cartridge lock functionally connected to said central processing unit and positioned adjacent said cartridge receiver for locking and unlocking a cartridge;

d. a medication release control gate positioned at said medication outlet and connected to a gate control mechanism;

e. said gate control mechanism having a second lock with a first position locking said gate closed and prohibiting medication unit dispensing by closing said gate, and a second position unlocking said gate and permitting medication unit dispensing by opening said gate;

f. a power source connected to said programmable central processing unit;

g. a multi-unit solid medication cartridge positioned in said cartridge receiver of said main housing, said cartridge being sized to be inserted into and fitted in said cartridge receiver and having a dispensing orifice for alignment with said medication outlet of said main housing, said cartridge having no moving parts;

h. a plurality of solid medication units located inside said cartridge and being freely moveable therein;

wherein, an authorized medication dispensing person will insert said multi-unit medication cartridge into said cartridge receiver of said main housing and lock it therein with said first lock, and will program said central processing unit to permit a patient user to accomplish dispensing activation according to a predetermined schedule such that when medication dispensing is permitted, said second lock will unlock and said patient dispensing control component may be activated by said patient and said gate mechanism may be activated for dispensing, and when medication dispensing is prohibited, said second lock will lock and said gate control mechanism cannot be activated, and, further, wherein, a patient user may then receive said device and activate medication dispensing according to said schedule at any time that it is permitted, by operating said gate.

2. The patient activated, programmable, refillable medication dispenser, with internally scheduled metered medication unit dispensing, of claim 1 which further includes an externally exposed operate-indicator that has a first setting to indicate that said dispenser is inoperable and a second setting to indicate that said dispenser is operable for controllably releasing a medication unit from said cartridge.

3. The patient activated, programmable, refillable medication dispenser, with internally scheduled metered medication unit dispensing of claim 2 wherein said indicator is selected from the group consisting of a visual indicator, and an audio indicator and combinations thereof.

4. The patient activated, programmable, refillable medication dispenser, with internally scheduled metered medication unit dispensing of claim 1 wherein said multi-unit medication cartridge lock includes a solenoid and lock bar having an extended lock position and a retracted unlock position, and in wherein said solenoid is functionally connected to said central processing unit.

5. The patient activated, programmable, refillable medication dispenser, with internally scheduled metered medication unit dispensing of claim 1 wherein said medication release control gate includes a gate wall and a gate solenoid functionally connected to said gate, said solenoid having a push bn, said push bar having an extended position maintaining a locked gate and having a retracted position maintaining an unlocked gate.

6. The patient activated, programmable, refillable medication dispenser, with internally scheduled metered medication unit dispensing of claim 1 wherein said gate is a rotatable toggle gate which extends externally from said main housing on a rotational axle and said patient user may depress said toggle gate to release medication during scheduled times when dispensing is permitted.

7. The patient activated programmable, refillable medication dispenser, with internally scheduled metered medication unit dispensing of claim 1 wherein there is further:

at least one patient user control component connected to said central processing unit and externally exposed for user dispensing activation that functions as a child resistant feature that must be activated to move said gate control mechanism to its second position, to permit medication unit dispensing by opening said gate.

8. The patient activated, programmable, refillable medication dispenser, with internally scheduled metered medication unit dispensing of claim 7 wherein said patient user dispensing control component is a button and said button operates in conjunction with said gate as a child resistant feature that must be activated to dispense medication.

9. The patient activated, programmable, refillable medication dispenser, with internally scheduled metered medication unit dispensing, of claim 1 wherein there is a spring mechanism connected to said gate that biases said gate to its closed position.

10. The patient activated programmable, refillable medication dispenser, with internally scheduled metered medication unit dispensing, of claim 1 wherein there is further:

a communication mechanism connected to said control processing unit and adapted to communicate with a separate programming device for locking and unlocking said multi-unit medication cartridge.

11. The programmable, refillable medication dispenser with scheduled metered medication unit dispensing of claim 10 wherein said communication mechanism is selected from the group consisting of a wire port, a wireless transmitter receiver, and a combination thereof.

12. The programmable, refillable medication dispenser with scheduled metered medication unit dispensing of claim 11 wherein said communication mechanism is an NFC reader.

13. The patient activated, programmable, refillable medication dispenser, with internally scheduled metered medication unit dispensing, of claim 1 wherein there is further:

a communication mechanism connected to said control processing unit and adapted to communicate with a separate programming device for setting lock and unlock time frames for said timer.

14. The programmable, refillable medication dispenser with scheduled metered medication unit dispensing of claim 13 wherein said communication mechanism is selected from the group consisting of a wire part, a wireless transmitter receiver, and a combination thereof.

15. The programmable, refillable medication dispenser with scheduled metered medication unit dispensing of claim 14 wherein said communication mechanism is an NFC reader.

16. The patient activated, programmable, refillable medication dispenser, with internally scheduled metered medication unit dispensing, of claim 1 wherein there is further:

a communication mechanism connected to said control processing unit and adapted to communicate with a separate programming device for coupling a power transmission to said dispenser.

17. The programmable, refillable medication dispenser with scheduled metered medication unit dispensing of claim 16 wherein said communication mechanism is selected from the group consisting of a wire port, a wireless transmitter receiver, and a combination thereof.

18. The programmable, refillable medication dispenser with scheduled metered medication unit dispensing of claim 17 wherein said communication mechanism is an NFC reader.

* * * * *